United States Patent [19]
Taciuk et al.

[11] Patent Number: 5,217,578
[45] Date of Patent: Jun. 8, 1993

[54] DRY THERMAL PROCESSOR

[75] Inventors: William Taciuk; Roderick Caple; Sean Goodwin; Gordon Taciuk, all of Calgary, Canada

[73] Assignee: Alberta Oil Sands Technology and Research Authority, Edmonton, Canada

[21] Appl. No.: 511,904

[22] Filed: Apr. 23, 1990

Related U.S. Application Data

[63] Continuation of Ser. No. 355,263, May 22, 1989, abandoned.

[51] Int. Cl.⁵ .......................... C10B 1/10; C10B 49/18
[52] U.S. Cl. .......................... 202/100; 202/114; 202/117; 202/136; 202/216; 202/267.2; 202/268; 432/106; 432/118
[58] Field of Search .......... 202/100, 117, 118, 136, 202/216, 131, 114, 265, 267.2, 268; 201/12, 33, 28; 34/128, 129; 432/106, 111, 103, 118; 422/209; 110/246

[56] References Cited

U.S. PATENT DOCUMENTS

| | | | |
|---|---|---|---|
| 1,457,083 | 5/1923 | McIntire | 201/131 |
| 1,589,417 | 6/1926 | Nielsen | 202/100 |
| 2,813,822 | 11/1957 | Collier | 202/131 |
| 3,033,057 | 5/1962 | Gray | 423/103 |
| 3,607,121 | 9/1971 | Watson et al. | 34/129 |
| 3,918,893 | 11/1975 | Whitaker | 432/103 |
| 4,260,372 | 4/1981 | Keller | 432/103 |
| 4,280,879 | 7/1981 | Taciuk | 202/100 |
| 4,285,773 | 8/1981 | Taciuk | 202/100 |

Primary Examiner—Joye L. Woodard
Attorney, Agent, or Firm—Millen, White, Zelano & Branigan

[57] ABSTRACT

The processor is of the type incorporating horizontal, concentric, co-extensive inner and outer tubular members which rotate together. The processor is modified in the following respects:

The front end of the inner tubular member is circumferentially corrugated and may be provided in the form of a plurality of parallel tubes arranged in a ring array, to thereby increase the shell area to promote heat transfer through the tube walls;

Means are provided for interconnecting the tubular members, which means can accommodate differing rates of thermal expansion and;

a rock recycle tube assembly is provided to recover oversize material leaving the corrugated portion of the inner tubular member and reject it from the processor.

28 Claims, 19 Drawing Sheets

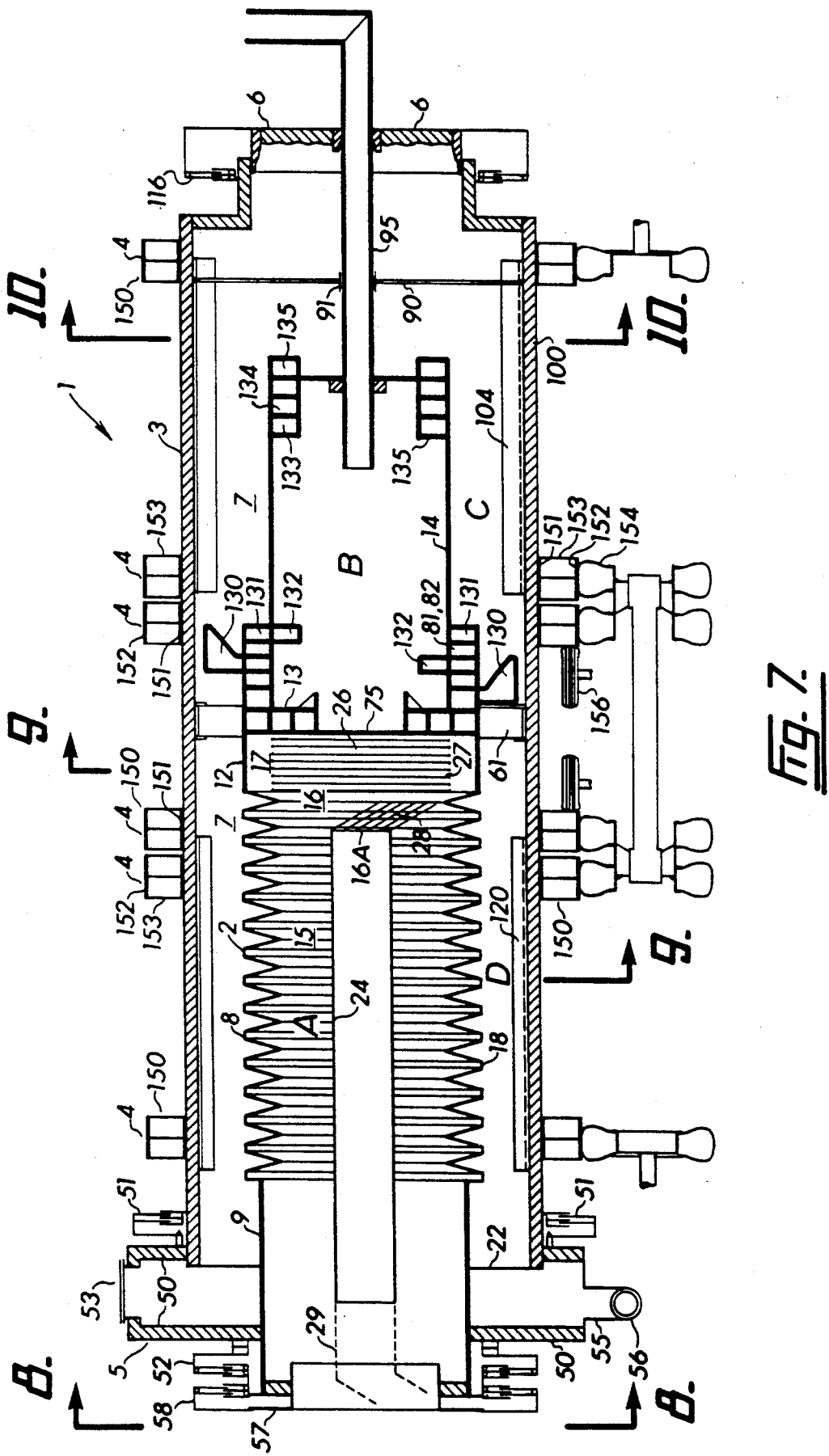

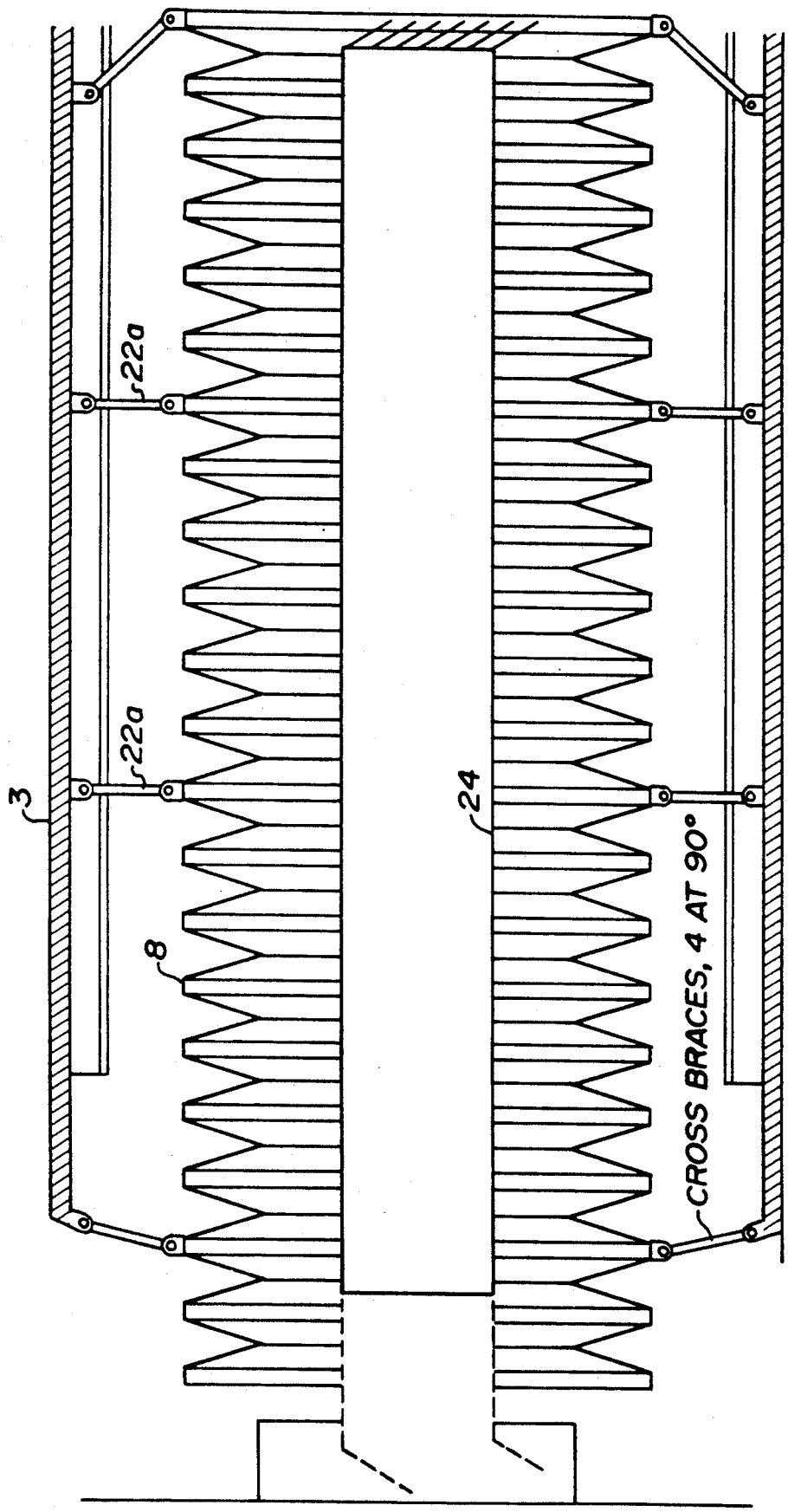

Fig. 24.

DRY THERMAL PROCESSOR

This application is a continuation of application Ser. No. 07/355,263, filed May 22, 1989, now abandoned.

BACKGROUND OF THE INVENTION (i) Field of the Invention

The present invention pertains in one aspect to an improved version of a dry thermal processor for extracting volatile substances from a particulate host material. The processor is of the type incorporating horizontal, concentric, substantially co-extensive, inner and outer tubular members which are interconnected and which rotate together about a horizontal axis. The feedstock enters at one end of the inner tubular member, advances through it, and is heated by hot solids returning through the annular space between the tubes.

In another aspect, the invention pertains to an improved version of the process wherein the feedstock is initially advanced through the inner tubular member and is heated in two stages, firstly to vaporize water contained in the feedstock and secondly to pyrolyse hydrocarbons and produce coked solids. The coked solids are transferred into the annular space, wherein the coke is burned to produce hot solids. Part of the hot solids is recycled into the hydrocarbon vaporization or reaction zone to provide needed heat for that zone. The balance of the hot solids is returned through the annular space and is used to transfer heat into the water vaporization or pre-heat zone by contact with the wall of the inner tubular member.

(ii) Prior Art

The present invention relates to improved versions of the processor and the process disclosed in U.S. Pat. Nos. 4,280,879 and 4,285,773.

A pilot plant-scale processor in accordance with the patents was built and operated on an experimental basis for a number of years. In the course of the work, certain problems were ascertained and solutions to the problems were developed. The processor and its method of operation were significantly modified. The modified versions of apparatus and process provide the basis for the present invention.

The patented processor was originally designed with the primary objective of extracting hydrocarbons from the oil sands of the Athabasca region in Northern Alberta. Such oil sands typically comprise grains of sand individually sheathed in a thin membrane of connate water. The water contains minute clay particles. Bitumen is trapped in the interstices between the water-sheathed sand grains. Stated otherwise, oil sand is a mixture of particulate solids, water and hydrocarbons. The prior processor was designed to recover some of the hydrocarbons, separate from the water and solids.

In the course of the piloting work, the patented processor and its method of operation were shown to be applicable to feedstock other than oil sand. Such feedstock also involved a mixture of particulate solids, water and volatile substances (including hydrocarbons). More specifically, the processor was operated to treat crushed oil shale and contaminated soil mixtures from waste dumps, with beneficial results.

In its original form, the patented processor broadly involved the following:

A pair of concentric, substantially co-extensive, horizontal, radially spaced apart inner and outer tubes (sometimes referred to as "tubular members") were provided. the tubes were rigidly interconnected and adapted to be rotated together about their longitudinal axis;

There was thus formed an enclosed, elongate, cylindrical inner space and an enclosed outer annular space. These spaces or passageways were "open", in the sense that they were substantially unobstructed except as described below;

The cylindrical inner passageway was divided at a point along its length by a transverse baffle into an upstream water vaporization zone (or "pre-heat" zone) and a downstream hydrocarbon vaporization zone (or "reaction" zone). The baffle was supplied to assist in segregating the gaseous atmospheres of the pre-heat and reaction zones. Spiral open-ended chutes were associated with the baffle and formed passages extending through the baffle at its periphery. These passages enabled solids to move from the pre-heat zone into the reaction zone. The presence of the solids in the chutes combined with the presence of the baffle itself to substantially prevent the movement of gases from one zone to the other;

A conveyor extended through a first end frame for feeding feedstock into the first end of the pre-heat zone;

Screwing elements, such as upstanding plates angled relative to the longitudinal axis of the inner tube, were secured to the inner surfaces of the inner and outer tubes, to add fine control for advancing or retarding the movement of solids through the inner space and the annular space;

A first fan system, having a conduit extending into the pre-heat zone, provided suction and means for withdrawing water vapour and light hydrocarbon vapours from said zone;

A second fan system, having a conduit extending into the reaction zone, provided suction and means for withdrawing hydrocarbon vapours therefrom;

A baffle and seal assembly was provided at the second end of the inner tube. This baffle and seal assembly was also of the previously described spiral chute type and was adapted to prevent gas movement between the reaction zone and the annular space, while still enabling coked solids to move from the reaction zone into the second end of the annular space;

The annular space provided a combustion zone at its second end and a heat transfer zone at its first end;

An air injection system was provided to supply pre-heated air through the second end frame into the combustion zone, for supporting combustion of the coked solids;

A gas burner fire tube also projected through the second end frame into the combustion zone;

A recycle assembly, connecting the annular space with the first or upstream end of the reaction zone, was provided at the first or downstream end of the combustion zone, for transferring some of the hot solids, leaving the combustion zone, back into the reaction zone. The recycle assembly involved a spiral chute coiled around the inner tube and extending through the tube wall. The chute was adapted to scoop hot solids from the annular space and, as a result of rotation with the inner tube, to deliver the solids to the combustion zone. The chute and its load combined to substantially prevent gas movement between the annular space and the reaction zone;

There were lifter elements attached to the inner surface of the outer tube in both the combustion and heat transfer zones. In the combustion zone, these lifters would drop the coked solids particles in dispersed, curtain-like fashion through the injected air, to encourage combustion. In the heat transfer zone, the hot solids were lifted and cascaded onto the pre-heat portion of the inner tube, to supply heat to the tube wall by solid-to-solid heat transfer;

A third fan system, having a conduit extending into the annular space, provided suction and means for withdrawing the flue gases therefrom; and Means, such as a conveyor, extended through the first end frame for removing cooled solids from the downstream end of the annular space.

In the operation of the prior art processor, the following occurred:

The feedstock was heated in the pre-heat zone by heat transfer through the tube wall. In the case of oil sand, large cohesive chunks were ablated by the heating and mild cascading action within the rotating inner tube. Contained water and the lightest, low boiling point hydrocarbons were vaporized and removed by the first fan system. And the contained rocks were freed from the rest of the oil sands so that they could be separated by screening at the downstream end of the zone and removed from the main feed stream;

In the reaction zone, the pre-heated feed was mixed with hot solids recycled from the annulus, to thereby raise the temperature of the feed. Hydrocarbons were vaporized and cracked. Residue coke formed on the solids particles. And the hydrocarbon gases were separately recovered by the second fan system;

In the combustion zone, the coked solids were lifted and dropped through the injected air and burned to yield hot solids. The solids were also heated in part by the auxiliary heater. Part of the hot solids was recycled into the reaction zone, to supply the heat needed to raise the temperature of the feed to the desired hydrocarbon vaporizing/cracking temperature. And the balance of the hot solids was advanced into the heat transfer zone of the annulus;

In the heat transfer zone, the hot solids were lifted and dropped onto the pre-heat portion of the inner tube, to heat the inner tube wall as required;

And the suction systems plus the seal devices were used to substantially isolate the pre-heat, reaction and annular zone gaseous atmospheres, one from another.

In a broad context, the processor can be characterized as a self-powered heat transfer machine. Among the factors that require attention in its design are the following:

Heat must be transferred from the hot solids, moving through the annular space, to the cool solids moving through the pre-heat zone. The transfer of heat must be sufficient so that the exit temperature of the bed of feed in the pre-heat zone is raised from ambient to a temperature at which vaporization of water contained in the feed will be essentially complete, without significant vaporization of hydrocarbons. In the case of oil sand, this exit temperature should typically be about 550° F.;

Such transfer of heat is affected by the extent of contact between the hot solids and the pre-heat zone tube wall, the temperature and volume of the hot sand cascaded, the conductance of heat through the tube wall, the transfer of heat from the tube wall into the feed bed, and the movement of heat through the bed itself;

Combustion of the coked solids and auxiliary fuels must be sufficient to raise the temperature of the solids to the desired value (in the case of oil sand, typically about 1300° F.), needed to satisfy the heat demands of the pre-heat and reaction zones;

The quantum of heat transferred into the reaction zone by recycle of hot solids must be sufficient to achieve the increase of temperature of the feed in the reaction zone which is needed to crack the hydrocarbons and produce lighter molecular weight hydrocarbons and coked solids;

The foregoing factors must be obtained while maintaining segregation of the gaseous products, so that contamination and hydrocarbon losses are minimal; and The machine is subject to elongation, expansion and contraction due to variations in temperature to which it is subjected. The outer tube is internally insulated and thus is not heated to a high temperature. The inner tube is, however, heated to high temperature. Therefore, there is a significant difference in the axial and radial expansions of the two tubes. Therefore, the processor needs to be designed to accommodate the relatively different physical changes which occur with heating.

It will be understood that there are a number of operating parameters which become generally fixed. For example, the rate of feed addition, the rate of recycle of hot sand to the reaction zone, and the rate of hot sand movement through the annular space all become relatively steady.

It also will be understood that, for the majority of operations, addition of supplemental heat is to be minimized, as auxiliary or off-site fuel would be a significant cost factor in the operation of the processor.

And it will further be understood that the machine should be kept as short as possible.

With the foregoing background in mind, it is now appropriate to summarize the invention.

SUMMARY OF THE INVENTION

In accordance with one aspect of the invention, a processor of the type described is provided with at least one circumferentially corrugated pre-heat tube. In larger forms of the processor, processing a high throughput of feedstock, a plurality of pre-heat tubes are used.

The plurality of pre-heat tubes are preferably interconnected, to form a rigid beam-like structure. The pre-heat tubes also preferably are each formed with a circumferentially corrugated configuration. The corrugated configuration refers to a folding of the shell surface to obtain a larger surface area within an equivalent length. As previously stated, in the case of very low throughput processors there may not physically be enough room for more than one tube. In this circumstance, a single pre-heat tube is provided having a corrugated wall.

As a result of using a pre-heat tube having a corrugated wall, and preferably using a plurality of such corrugated pre-heat tubes, a pre-heat section of relatively high surface area is provided in the shortest processor length. By providing increased tube surface area, the heat transfer capacity of the pre-heat tube section is greatly increased.

In test work carried out with the pilot processor, it was discovered that it was relatively easy to bring the required heat to the inside surface of the pre-heat tube. But it was found that the heat did not conduct well through the bed of angular sand particles, which commonly are in point-to-point contact and which do not roll to any significant extent within the bed. Because of the relatively low heat conductivity of the bed, either the pre-heat zone surface area had to be increased by lengthening the zone or the material throughput had to be reduced in order to reach the desired end temperature. Another affect of unresolved low heat transmission was the poor cooling of the exiting annular solids. This resulted in excessive solids discharge temperatures.

The utilization of a plurality of pre-heat tubes, particularly circumferentially corrugated tubes, significantly alleviates these problems by greatly increasing the quantum of heat transferred from a quantum of annulus solids into a quantum of feed in a specific time period.

The problem is preferably further alleviated by controlling the bed width in a pre-heat tube so that the minimum angle, formed by imaginary lines extending radially from the edges of the bed to the axis of the tube, is in the order of about 110 degrees. By using a bed of these dimensions, there is ensured a broad contact area between the hot steel of the pre-heat tube and the bed of feed.

In summary then, by dint of experimentation we have ascertained that a single tube, plain cylindrical shell pre-heat assembly requires an undesirably low feed rate or an inordinately long pre-heating tube in order to achieve the desired oil sand bed end temperature. Having ascertained the problem, we have developed a novel processor which is better able to cope with this difficulty.

In another preferred aspect of the invention, the plurality of pre-heat tubes are arranged in a ring-like pattern and a rock recycle tube is provided to extend along the center line of the ring. Means, such as a screen and chute assembly, recovers oversize rocks and lumps from the feed at the downstream end of the pre-heat zone and transfers them into the rock recycle tube, for return to the feed end of the processor for removal. This change removes the rocks from the processor in a way such that they will not damage the lifters in the annular space. It was found in the piloting program that the lifters are relatively fragile and become damaged when impacted by the rocks. In the smaller implementation of the processor, using a single pre-heat tube, this rock recycle tube is also provided, centrally located internal to the inner tube.

In the course of processing oil sand with the pilot processor, it was also discovered that a tarry deposit would build up on the inner surface of the pre-heat tube, particularly at its downstream end (which is the hottest end). This deposit was found to have an inhibiting effect on heat transfer from the tube steel wall into the feed bed. Two solutions to this problem suggest themselves. One could overdesign the processor to ensure that production targets could be met in spite of the build-up of such a deposit. The deposit could then be cleaned out during periodic shut-downs of the line. Or one could devise a means for removing the deposit on an on-going basis or a means for preventing its formation. We chose to explore the latter solutions.

As a first attempt to eliminate the deposit, chains were hung within the tube to slap against the deposit to dislodge it. These chains were unsuccessful. Then a stainless steel liner was applied to the inner surface of the pre-heat tube at its downstream or second end. It was anticipated that the slick surface of the liner, in combination with a slightly lower shell surface temperature, perhaps lower than the cracking temperature for oil sand, would eliminate the build-up. However, the liner was also not successful in sufficiently relieving the problem. It was eventually noted that rocks present in the feed were collecting at the pre-heat zone end and were impacting against the tarry layer and shearing it away in chunks. However, the quantities of rocks associated with the oil sand feeds treated by the processor were insufficient to satisfactorily control the fouling of the pre-heat tube.

It is therefore a preferred aspect of the invention to recycle some of the rocks, returning through the rock recycle tube, back into the first ends of the pre-heat tubes, to thereby maintain an increased concentration of rocks in the feed, for purposes of removing the tarry deposit.

In another preferred aspect of the invention, modifications are made to alleviate the problems arising from the differential thermal expansions and contractions which characterize the inner and outer tubular members. As previously stated, the outer tubular member is internally insulated with refractory. The outer steel tube thus remains relatively cool and its expansion or contraction due to thermal effects is relatively minor. However, the inner tubular member is within the insulation and expands and contracts significantly when the processor changes between the operative hot and inoperative cold modes.

In the case of the pilot processor, the problem of differential thermal expansion was recognized but not successfully dealt with. The first end of the inner tubular member was supported by spring washer-loaded support posts. These eventually failed and solid posts were welded in place. This approach was subject to eventual cracking of the weld sites. The support of the second end of the inner tubular member was originally a group of similar spring washer-loaded, inclined, multiple post supports. This latter assembly eventually failed as well and was replaced by multiple vertical post supports welded to the two tubular members.

The original connection of the inner and outer tubular members at the junction of the pre-heat and reaction zones was a spring connected structure wherein radial motion flexed the springs in one plane, while inner member support was provided by the stiff section of the spring in the other plane. After significant operation, inspection of this area revealed cracked welds. Modifications were made to this area. More particularly, a plurality of internal pins, which were capable of radial growth, were installed but were restrained from axial and torsional movements by thrust blocks. This system lasted only a short time before the welds failed. Another modification was made. This second system involved a solidly welded structure offering some radial flexibility due to outer member solid blocks being welded in the middle of a wide flange which was subsequently welded at either edge to the inner member. Post operation inspection has not yet revealed cracking at the connection sites.

Investigation of alternate design aspects for this area resulted in the conception of several solutions involving uncoupling the inner and outer tubular members and enabling free and independent movement of the tubular members in a radial direction with respect to each other, while preventing movement in the axial and rotational directions. These concepts produced mechanically complex arrangements, with components prone to wear and a requirement for periodic replacement.

Recognizing the inherent simplicity and security of the rigid connection, it was determined that the key was not to accept differential radial expansion and work around it but to work with it and manipulate the intensity of differential movement.

To accommodate the relative dimensional changes of the tubular members, there is now provided one or more preferred features, namely:

Means are provided for supporting the pre-heat tubes of the inner tubular member at their feed ends in a vertical direction, against sagging, said means being operative to permit limited axial elongation or contraction of the tubes. Preferably such means comprises an inwardly extending thin steel membrane or wall which provides vertical support for the tubes but can bend to accommodate their axial elongation or contraction;

Means are provided, at about the junction of the pre-heat and reaction zones, for locking the inner and outer tubular members together for rotation as a unit, for pinning them together to prevent relative axial displacement, and to support and centralize the inner tubular member in the outer tubular member. These means are adapted to accommodate differential radial expansion and contraction of the two tubular members.

In one form, such means may involve providing radial spokes extending between the two tubular members and being solidly secured to each of them. The materials, from which the spokes and the outer tubular member shell (in the vicinity of the spokes) are made, are preferably complementary, to minimize the difference in expansion and contraction. For example, the outer tubular member shell may be formed of material having a relatively high thermal coefficient of expansion (e.g. an austenitic stainless steel). The spokes, and perhaps the inner tubular member in the vicinity of the spokes, may be formed of material having a relatively low thermal coefficient of expansion (e.g. a Ni-Cr alloy steel). In a preferred embodiment, the spoke may be hollow and air-cooled through an aperture formed in the outer tubular member.

In another form, the means may comprise a peg-and-socket system wherein one tubular member carries spokes and the other carries sockets which lock onto the spokes but permit of limited radial expansion; and Means are provided for supporting the vaporization tube against sagging, while permitting of axial elongation and contraction. Such means may comprise a loosely fitting collar supporting the tube and tangential struts, pivotally secured to the collar, extending out and affixed to the outer tubular member.

In another preferred aspect of the invention, a novel riding ring assembly is provided. In applications such as oil sand processing, the processor necessarily has to be very large to process the large tonnages of feedstock that are needed for economic viability. A typical outer tube diameter might be 30 feet. To rotate and support an outer tube, it would be conventional in the kiln art to use a riding ring having circumferential gear teeth, to be acted on by a driven roller gear. Conventionally, a riding ring would be a cast one-piece steel element or a bolted-together sectional ring. However toothed ring assemblies having a large diameter tend to oval and are subject to alignment problems.

In accordance with a preferred feature of the invention, a sectional riding ring assembly comprising inner and outer ring members is provided. The ring members are radially spaced apart and interconnected by circumferentially spaced apart struts that function as heat-dissipating fins. Rubber tires are used to support and drive the ring assembly.

This riding ring arrangement is characterized by the following advantages:

the use of tires accommodates alignment changes and reduces the observance of tight tolerances in machining the assembly;

the struts protect the tires from being damaged by the full extent of the heat associated with the inner ring member of the assembly; and the tires better spread the load.

In accordance with another preferred feature, the solids transfer chutes associated with the reaction zone are modified by providing internal transverse weirs at spaced points along their passageways. The weirs cause the sand charge moving through the chute passageway to create a plurality of sand seals or plugs along the length of the passageway. These multiple plugs reduce the leakage of gas through the passageway. Gas trapped between the plugs has an opportunity to escape back to its original zone through the slots between the weirs and the chute wall. As a result of incorporating the weirs, the product yield from the reaction zone is enhanced and its contamination is reduced.

DESCRIPTION OF THE DRAWINGS

FIG. 7 is a sectional side view showing both the inner and outer tubular members for a single pre-heat tube processor;

FIG. 7a is a side view of a slightly modified version of the single tube processor of FIG. 7, showing an alternative form of support for the pre-heat tube;

Figure 24:
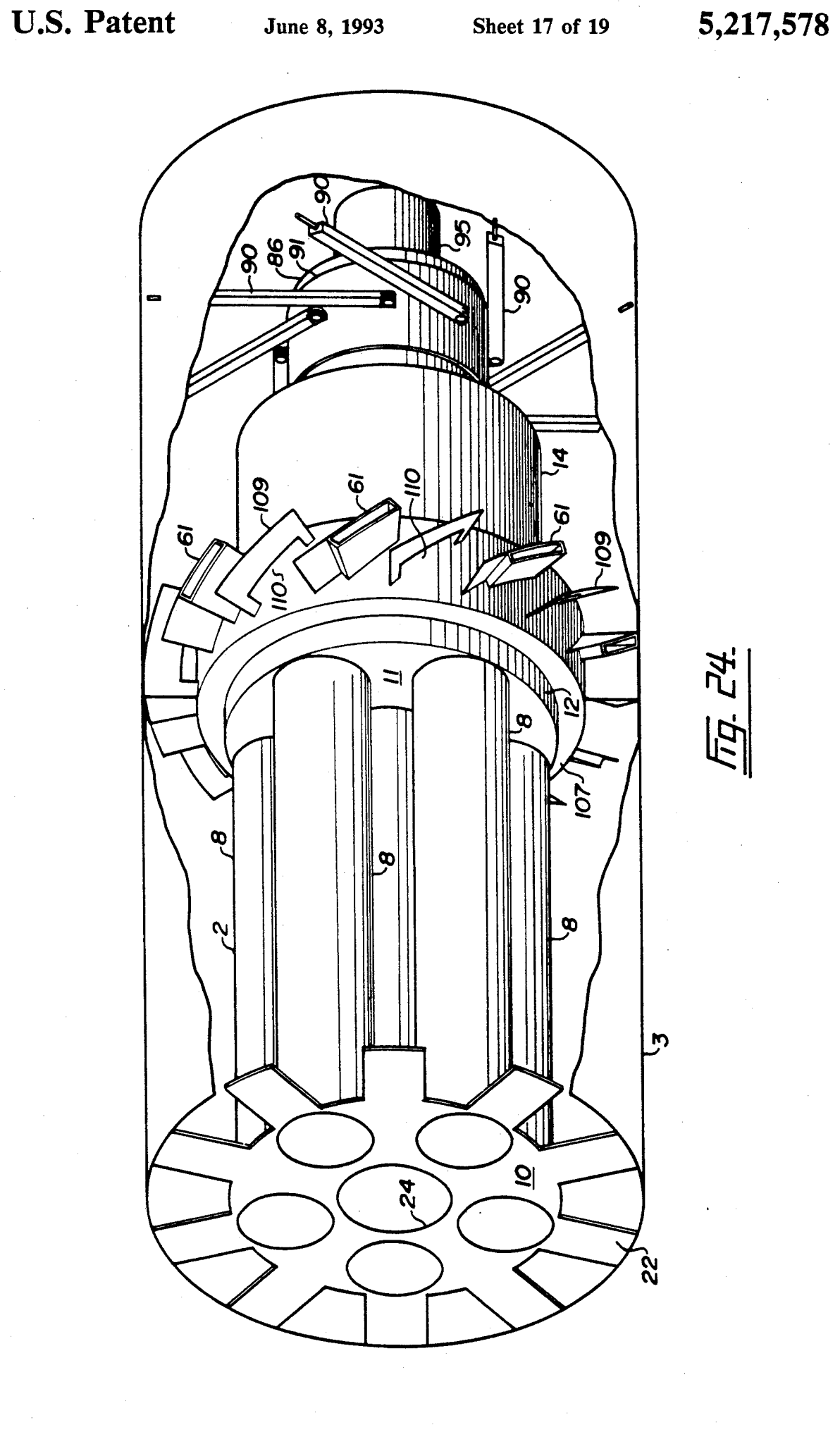

FIG. 24 is a perspective partly-broken-away view of the major inner tubular member supports including the pre-heat feed end support, the central spoked support, and the reaction zone end support;

DESCRIPTION OF THE PREFERRED EMBODIMENT

Figure 1:
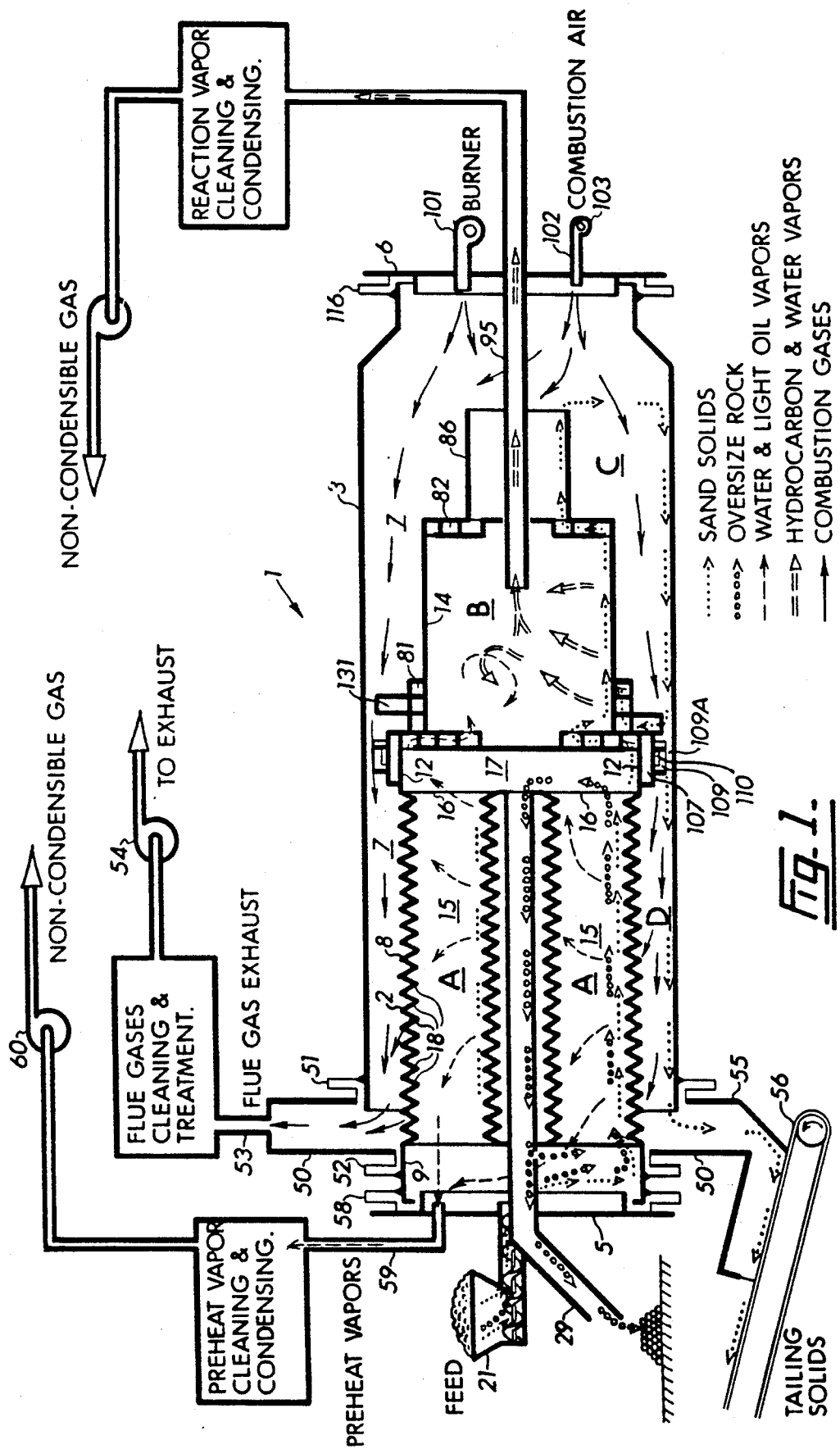
FIG. 1 is a schematic side view of a single pre-heat tube version of the processor, with arrows of different types indicating the various streams that would be present in connection with oil sand processing.

The processor 1 comprises inner and outer tubular members 2, 3. The tubular members 2, 3 are substantially concentric, co-extensive and horizontal. The outer tubular member 3 carries external riding rings 4 which are driven, for rotation. The tubular members 2, 3 are interconnected, so that rotation of the outer tubular member 3 induces corresponding rotation of the inner tubular member 2. Stationary end frames 5, 6 seal and enclose the open ends of the outer tubular member 3.

From its left hand (in the drawing) or first end, the inner tubular member 2 sequentially provides a pre-heat zone A followed by a reaction zone B. An annular space 7 is formed between the radially spaced apart tubular members 2, 3. This annular space 7 sequentially provides from its second end a combustion zone C followed by a heat transfer zone D.

The processor will now be described in greater detail. It will be noted that some of the drawings illustrate a single pre-heat tube version of the processor, which would be used in a low throughput application such as cleaning waste dump solids. In others of the drawings, there is illustrated a high throughput processor having multiple pre-heat tubes. This latter version would be used for oil sand processing.

The Pre-Heat Tubes

Figure 2:
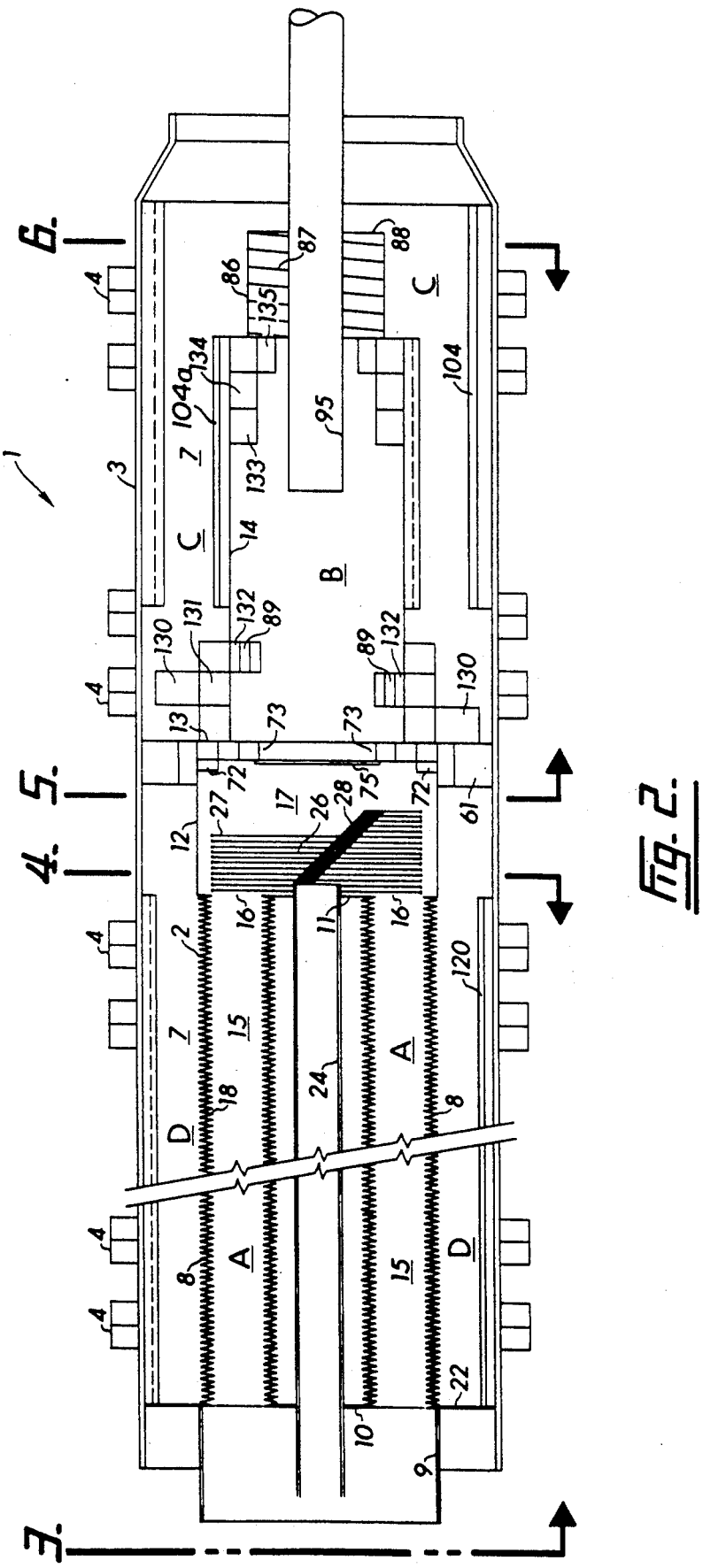
FIG. 2 is a sectional side view showing both the inner and outer tubular members for a multiple pre-heat tube processor.
Figure 3:
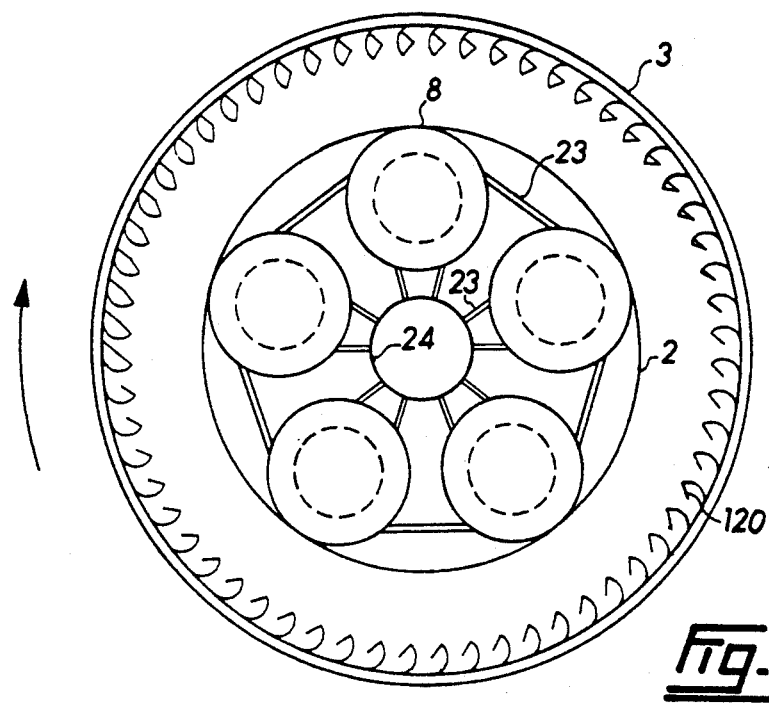
FIGS. 3-6 are sectional end views taken along the lines 3—3, 4—4, 5—5, and 6—6 respective of FIG. 2.
Figure 4:
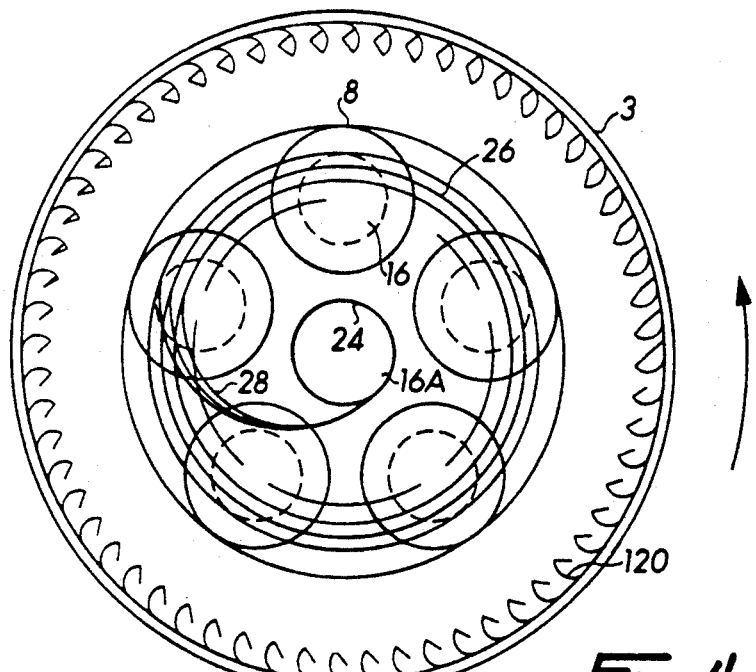
Figure 5:
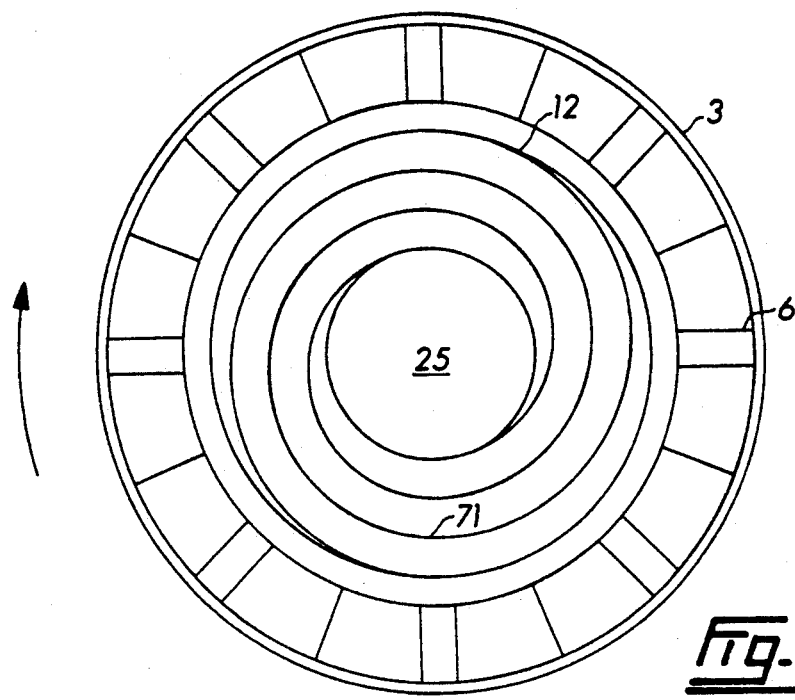
Figure 6:
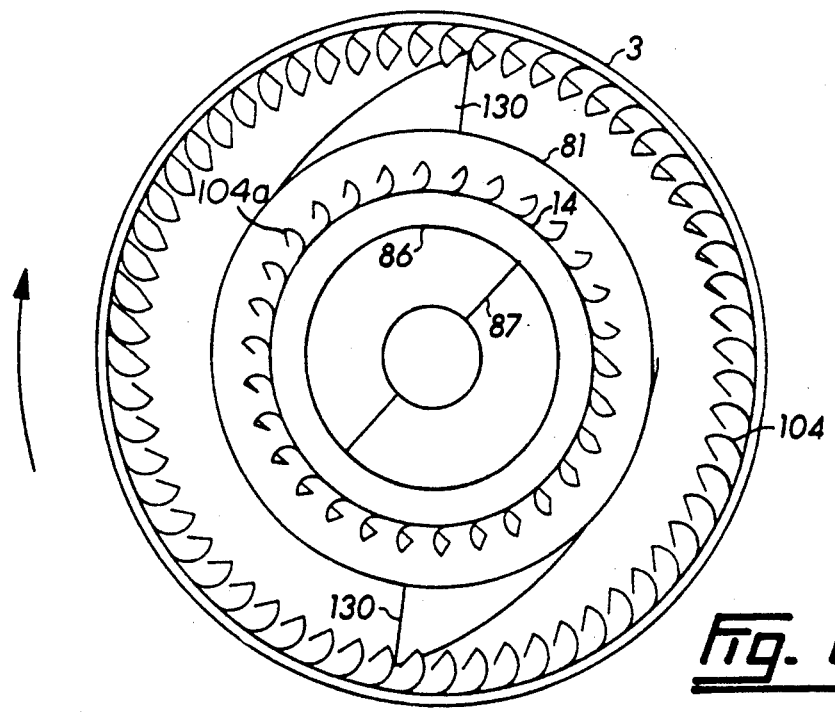
Figure 8:
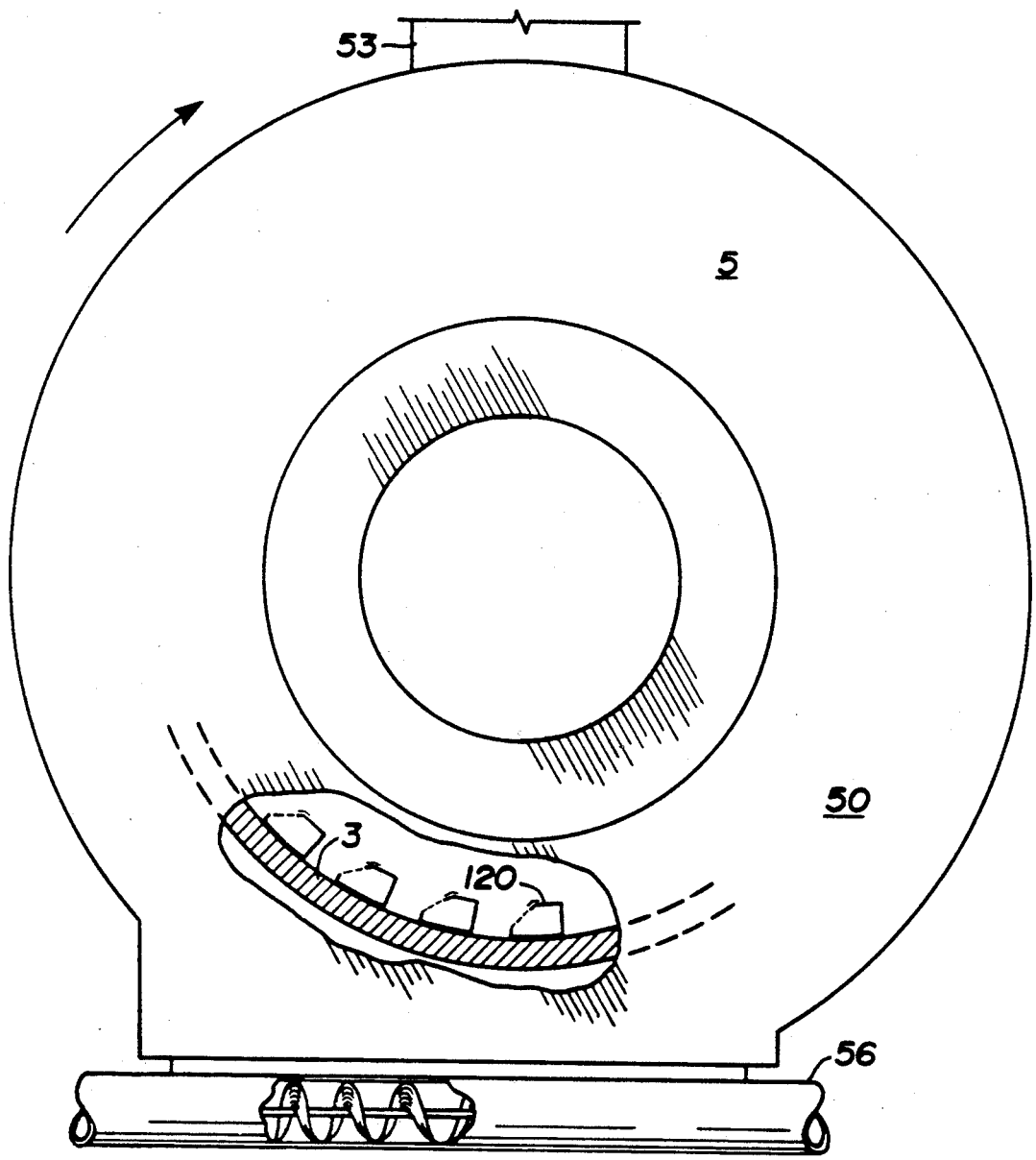
FIGS. 8-10 are sectional end views taken along 8—8, 9—9, and 10—10 respectively of FIG. 7.
Figure 9:
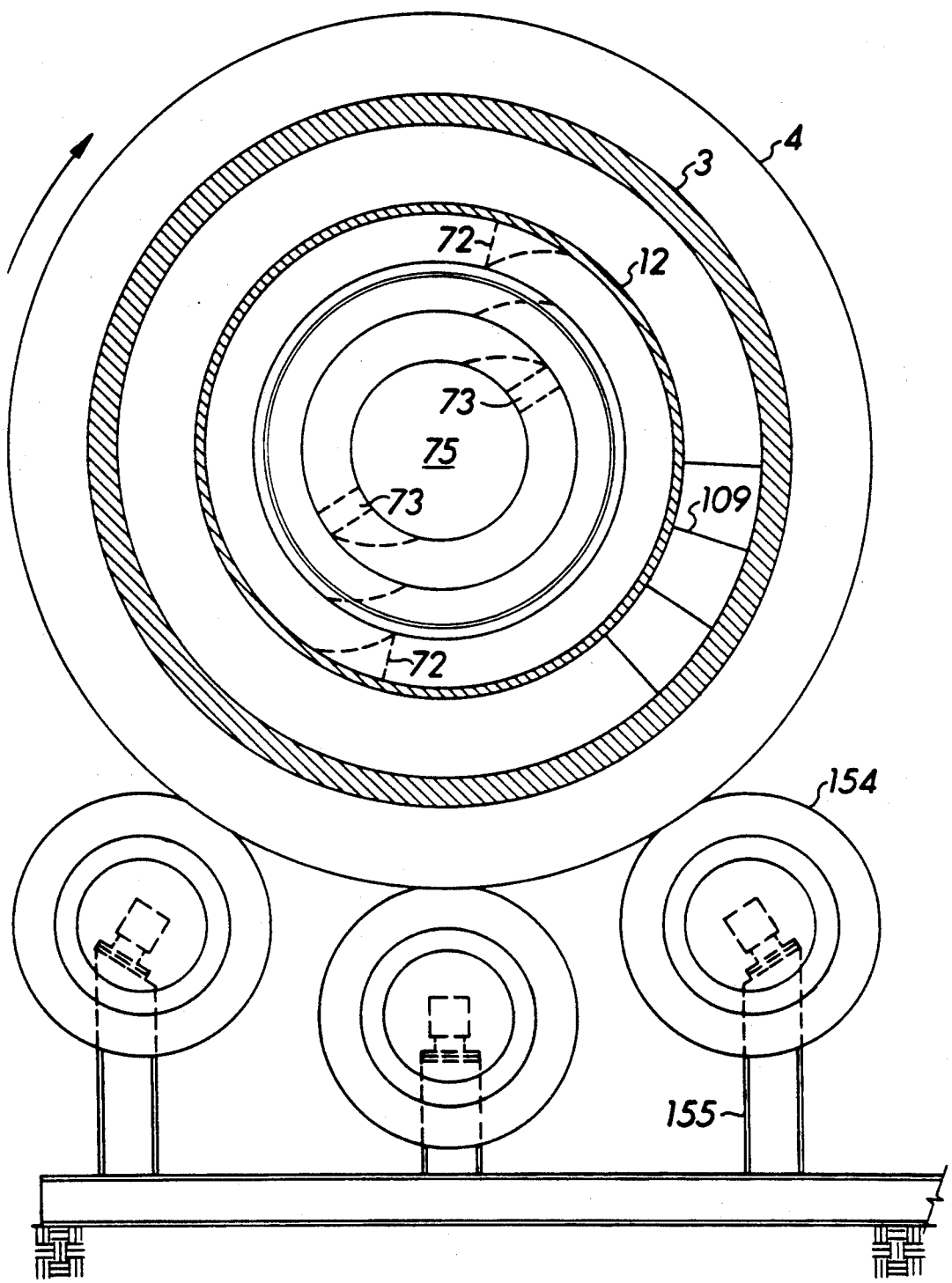
Figure 10:
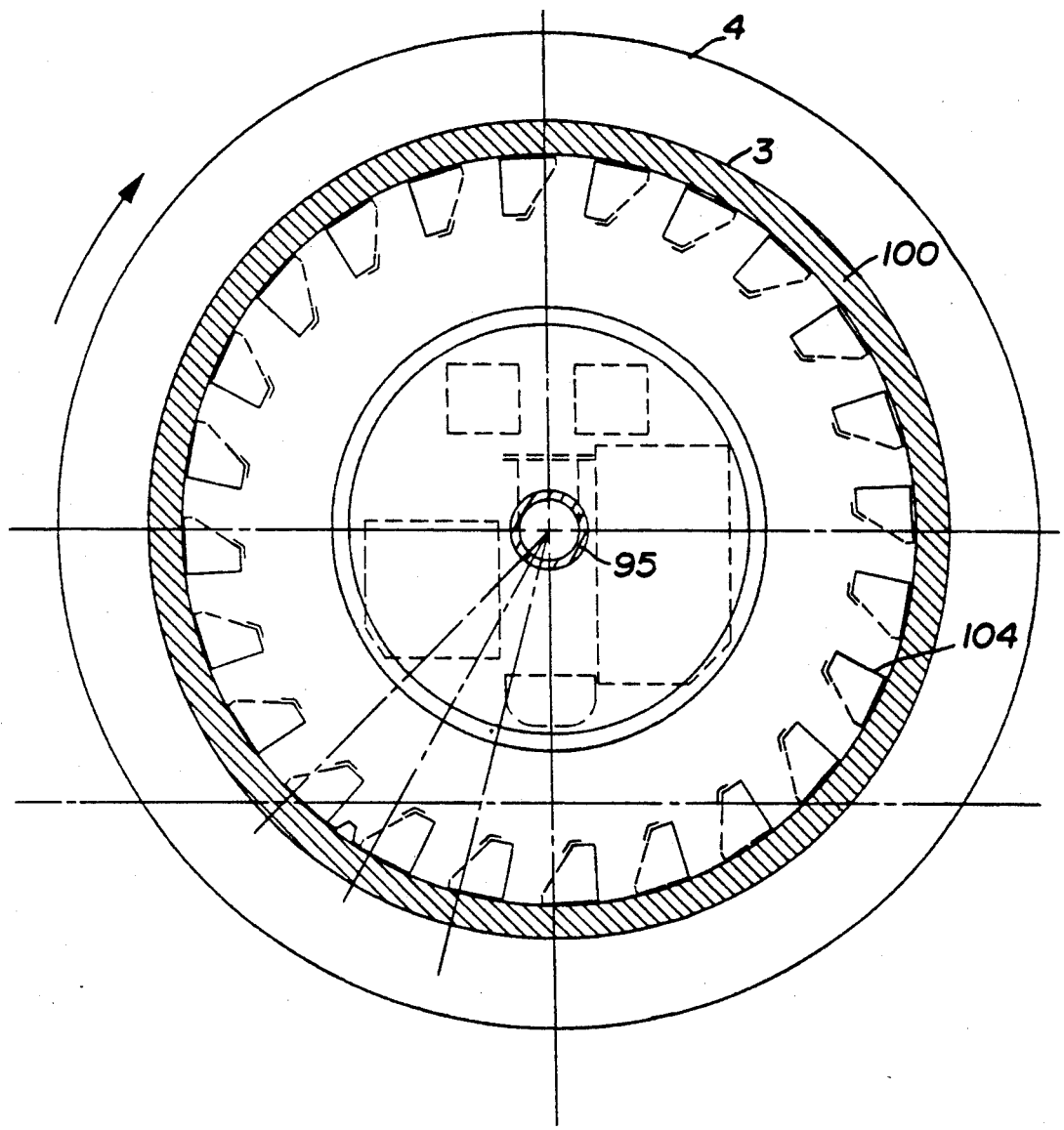
Figure 12:
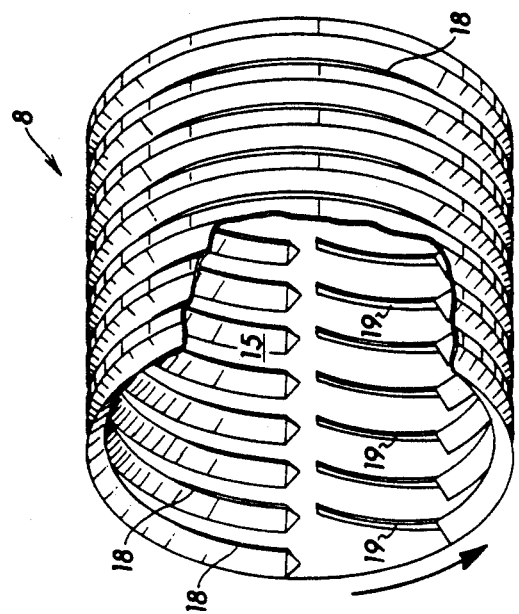
FIG. 12 is a perspective, partly-broken-away view of part of one corrugated pre-heat tube in the inner tubular member, showing the details of the interrupted corrugations, and internal elements.
Figure 11:
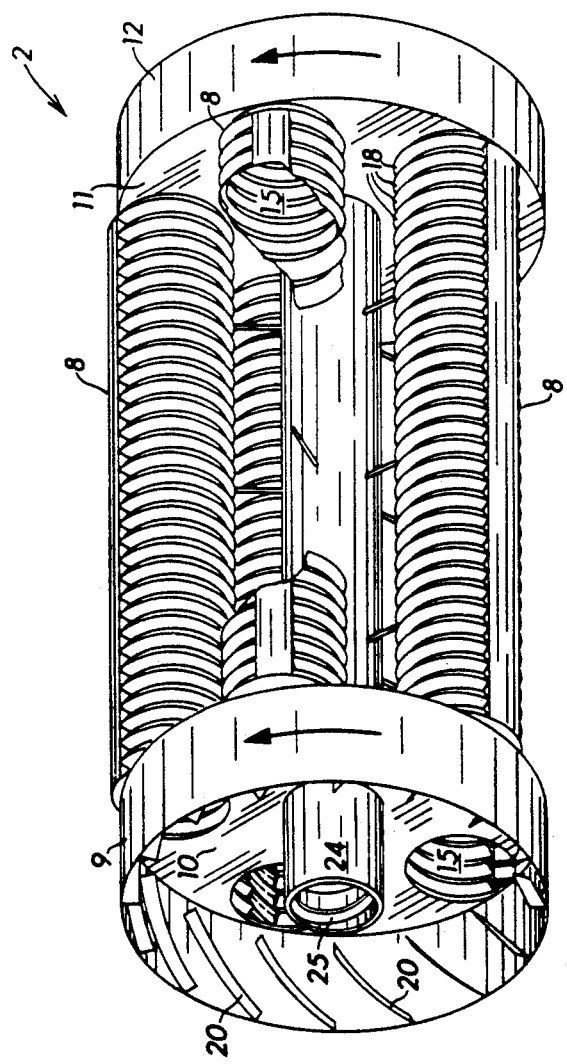
FIG. 11 is a perspective view from the first end of the internals of the inner tubular member at the feed inlet of the pre-heat zone, showing the junction means or transition tube, the inlet ends of the pre-heat tubes, multiple corrugated pre-heat tubes, and the pre-heat discharge transition tube—only one of the pre-heat tubes is shown fully corrugated.

The inner tubular member 2 shown in FIG. 2 comprises multiple, substantially parallel, spaced apart, horizontal pre-heat tubes 8 joined at their first and second ends to vertical baffles 10 and 11 respectively. FIGS. 2, 3 and 4 show five tubes, however this number is based upon the required throughput of the processor and the minimum tubular dimensions required for maintenance access. The baffle 10 is secured around its periphery to a short first transition tube 9. The baffle 11 is secured around its periphery to a short second transition tube 12. The second end of the second transition tube 12 is joined by a flange 13 to the first end of a vaporization tube 14 of reduced diameter. The internal passageways 15 of the pre-heat tubes 8 communicate through apertures 16 formed in the baffle 11 with the chamber 17 of the second transition tube 12. The baffle 11, transition tube 12 and flange 13 together form part of a junction means joining the pre-heat tubes 8 and vaporization tube 14.

The pre-heat tubes 8 are arranged in an annular pattern. Their internal passageways 15 collectively form the pre-heat zone A.

As shown, the side wall of each pre-heat tube 8 is formed in a corrugated configuration. The corrugations 18 are circumferential in nature. That is, the corrugations lie in vertical radial planes relative to the tube axis. The corrugations increase the area of the heat-conducting steel wall for a given length, compared to a straight-walled tube, and thereby significantly increase the thermal transmissibility of the tubes. As the corrugations 18 are circumferential in nature, many of the hot particles dropped thereon will momentarily and individually contact the tube wall, so that there is particle-to-steel wall heat transfer. However, due to the roundness of the circumferentially corrugated wall, the initial particles are quickly shed, so that newly dropped hot particles may repeat the process. Each corrugation is preferably interrupted on its circumference for insertion of an advancing or reversing plate 19. The plates 19 provide means for controlling, by advancing or retarding, the movement of the feedstock axially through the pre-heat passageways 15.

Advancing plates 20 are secured to the inner surface of the first transition tube 9, to feed the feedstock to be processed into the inlet ends of the pre-heat passageways 15.

Conveyors 21 extend through the first end frame 5 to deliver fresh feedstock to the transition tube 9. The conveyors 21 and end frame 5 are more specifically described below.

At their inlet ends, the pre-heat tubes 8 are supported by a thin vertical steel wall or membrane 22, secured around its periphery to the outer tubular member 3. This membrane 22 is adapted to provide sufficient vertical support to constrain the pre-heat tubes 8 from bending or sagging significantly. However, the membrane 22 is sufficiently flexible in a transverse direction so as to flex with the pre-heat tubes 8 when they elongate, expand or contract due to thermal effects. The membrane 22 surface is sufficiently perforated or discontinuous to allow the spent solids from the heat transfer zone D to pass through it and exit the processor 1.

As shown in FIG. 3, the pre-heat tubes 8 are preferably tied together in a plurality of vertical planes by links 23, for mutual support.

In the single pre-heat tube version shown in FIG. 7a, the pre-heat tube 8 is supported by pivotally mounted braces 22a extending from the outer tubular member 3. Four braces 22a are provided in a vertical plane in spaced relation around the pre-heat tube 8.

It will be noted that the membrane 22, or, alternatively, the braces 22a provide means for supporting the pre-heat tubes in a generally vertical direction to prevent sagging thereof, said means being operative to so support the pre-heat tube(s) while enabling them to expand and contract axially and radially.

Oversize Screen/Rock Return Tube

In the case where oil sand is the feedstock, it contains oversize solids, such as rocks and oil sand lumps. The pre-heat step is designed to mechanically ablate the lumps and heat the feed from an inlet ambient temperature to an outlet temperature (e.g. 550° F.) at which the contained connate water has been vaporized and the oversize solids may reasonably be separated form the rest of the tacky feed by screening. The oversize solids should not be allowed to proceed into the downstream zones, as they can damage the lifters and plug the chute seals which are described below and which are located in the downstream zones. So at the outlet of the pre-heat tubes 8 there is provided means for screening and separating oversize solids from the feed stream. There is also provided means for conveying the screened oversize solids to the first end of the processor for removal and means for transferring the oversize solids between the screening means and the conveying means.

More particularly, in the case of the multiple pre-heat tube processor, there is provided a rock recycle or return tube 24 which extends centrally through the ring of pre-heat tubes 8. The rock return tube 24 has upstanding angled plates 25 mounted on its inner surface for advancing the oversize solids from its second end to its first end. At its first end, the rock return tube 24 is joined to the baffle 10 and at its second end to the baffle 11. At its second end, the rock return tube 24 communicates through an aperture 16a with the chamber 17 of the transition tube 12. A tubular cage 26, formed by the spaced-apart coils 27 of a continuous, circularly formed bar, is positioned in the chamber 17 immediately downstream of the pre-heat tubes discharge apertures 16. A rock chute 28 of spaced bars leads from the cage 26 to the inlet aperture 16a of the rock return tube 24.

Thus, the pre-heated feed exiting the pre-heat tubes 8 drops onto the coils 27 of the cage 26. The oily sand particles drop through the openings in the screen or cage 26 while the oversize solids are transferred by chute 28 into the inlet end of the rock return tube 24, for conveyance to the first end of the processor 1. Here the greatest part of the oversize solids drops into a chute 29 for removal from the processor 1.

Rock Recycle

As previously mentioned, it has been found in the case of oil sand feed that a tacky layer of tarry sand gradually builds up on the inner surface of the wall of each pre-heat tube 8 at its second end. This layer impedes transfer of heat from the tube wall to the oil sand bed. As mentioned, it has been found that impacting the layer with rocks will cause chunks of the deposit to shear off. This finding has led to our concept of using rocks to scour the layer from the second ends of the pre-heat tubes 8.

To this end, we recycle some of the rocks, returning through the rock return tube 24, back into the inlet ends of the pre-heat tubes 8. We thereby maintain a greater concentration of rocks in the pre-heat zone A than would normally be contributed by the feed. This concentrated stream of rocks is used to scour the inner surface of the pre-heat tubes 8. The quantity of rocks recycled would be determined during operation.

To achieve such recycling, the pre-heat inlet end of the rock return tube 24 is provided with slots 30 which function to allow some of the returning smaller rocks to drop back into the pre-heat feed stream, while the tube 24 functions to eject the remainder out of the processors through a center line chute 29.

The profile of the rock recycle tube corrugations 18 would be appropriately matched to the feedstock. A feedstock less prone to depositing the tarry sand would not need large rocks recycled and the profile could be more pointed, like a sawtooth. In situations where it is expected to process very tacky feedstock, a corrugation profile more like that of a square thread, with a wide flatter profile, could be used to provide access to all surfaces by the recycling rock charge.

Advancing Means

Material moves in a rotating kiln by natural and induced means. Hydraulic action is a powerful impetus to solids movement. As the processor rotates, the bed of solids rises to its dynamic angle of repose and then begins a slumping and rolling action. The material will readily roll to an area of no solids, much like fluids flow downslope. This results in a natural progression of solids away from the source of feed. In the situation where this action is more than required and the solids are moving too quickly, then artificial retarding mechanisms are used. Where the solid material is moving too slowly and the material is accumulating in the zones, then advancing means may be utilized.

In the corrugated pre-heat tubes 8, the corrugations 18 may be interrupted on their circumference with upstanding, angled plates 19, installed to advance the material to the next corrugation.

If the rate of advance through the pre-heat zone A is excessive, then oppositely directed back-up plates 19 may be provided to spill some of the feed backwards and retard its advance.

Angled plates are similarly provided on the inside surfaces of the remainder of the inner and outer tubular members, as required, to advance the feed stream therethrough.

Such plates are provided to advance the feed at a controlled rate through the various zones.

In the case of oil sand feed, we seek to heat the incoming feed from ambient temperature (32°–70° F.) to about 550° F. As previously stated, this is done to vaporize contained water, to ablate lumps, and to render the oil sand amenable to screening. The temperature change is achieved through the mechanism of cascading hot sand, issuing from the combustion zone C at about 1300° F., onto the outer surfaces of the pre-heat tubes 8. As a result of heat transfer to the tubes 8, the now-cooled sand issuing from the first end of the heat transfer zone D is at a temperature of about 600° F.

It has been determined that the coefficient of heat transfer U through the steel wall of a pre-heat tube typically is about 100 Btu/hour/sqft/°F, while that through the sand bed in the pre-heat tube is only about 10 such units.

So the difficulty is not in getting heat to the inner surface of the tube wall—it is in getting heat distributed through the sand bed.

In order to improve heating of the sand bed, we have centered on increasing two factors, namely:

the surface area of the steel wall forming a pre-heat zone A of given length; and the extent of the sand bed width within each pre-heat tube.

More particularly, we use one or more corrugated pre-heat tubes and we prefer to maintain the width of the sand bed as wide as is practical, whereby the extent of the steel wall in direct contact with the sand bed is maximized. Preferably, we utilize a bed angle of about 110 degrees (the "bed angle" is the imaginary angle established by drawing lines from the edges of the bed to the central axis of the tube). The bed depth and width can be controlled by utilization of the advance and back-up plates 19.

The Spokes

A plurality of spokes 61 are joined to the transition tube 12 and extend outwardly and radially from it. These spokes 61 rigidly connect the inner tubular member 2 to the outer tubular member 3 to prevent rotational shifting of the latter relative to the former and to transfer load between the members 2, 3. The spokes 61 and outer tubular member 3, in the area of the spokes, are formed of complementary materials so that their thermal expansion rate is about equal.

Thus the inner and outer tubular members 2, 3 are pinned together at this central point along the length of the processor, so that one may not shift axially relative to the other. The inner tubular member 2 is suspended concentrically within the outer tubular member 3. And a drive connection is supplied between the outer and inner tubular members 3, 2 so that they rotate as one. Yet these ends are achieved while permitting of limited radial movement of the spokes 61 due to thermal expansion or contraction of the inner tubular member 2.

The spokes 61 elongate or contract as the outer tubular member 3 also expands and contracts radially at a complementary rate, due to an appropriate selection and use of material of construction.

In summary then, the spokes/materials of construction arrangement supplies drive connection and centralization while accommodating the differing thermal expansion and contraction rates of the inner and outer tubular members.

Figure 19:
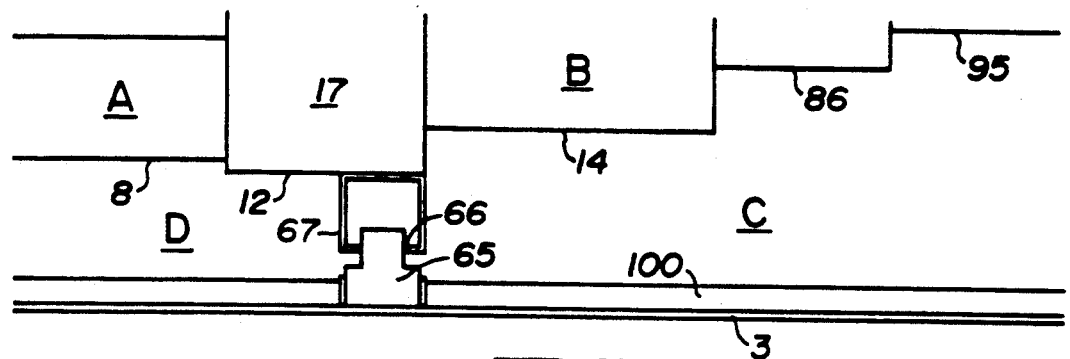
FIG. 19 is a sectional side view of an alternative peg-and-hole type spoked support assembly.
Figure 20:
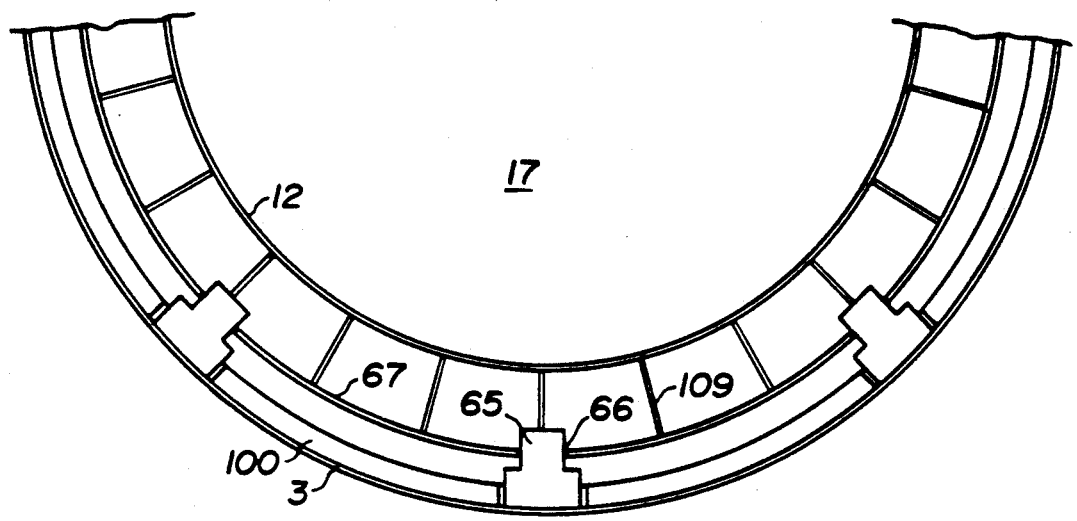
FIG. 20 is a sectional end view of the assembly of FIG. 19.
Figure 21:
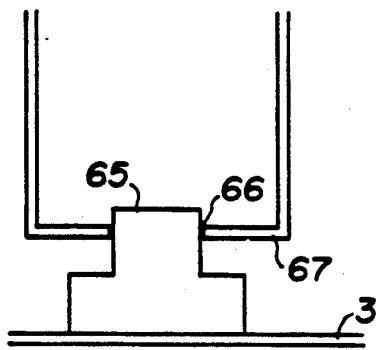
FIGS. 21 and 22 are simplified side views showing the peg-and-hole assembly of FIG. 19 when the processor is cold and hot respectively.
Figure 22:
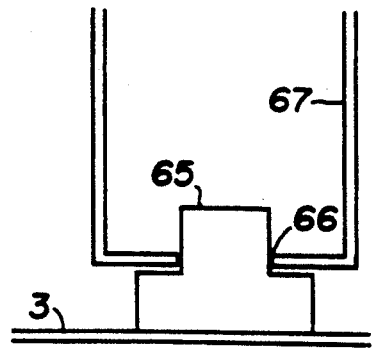
Figure 23:
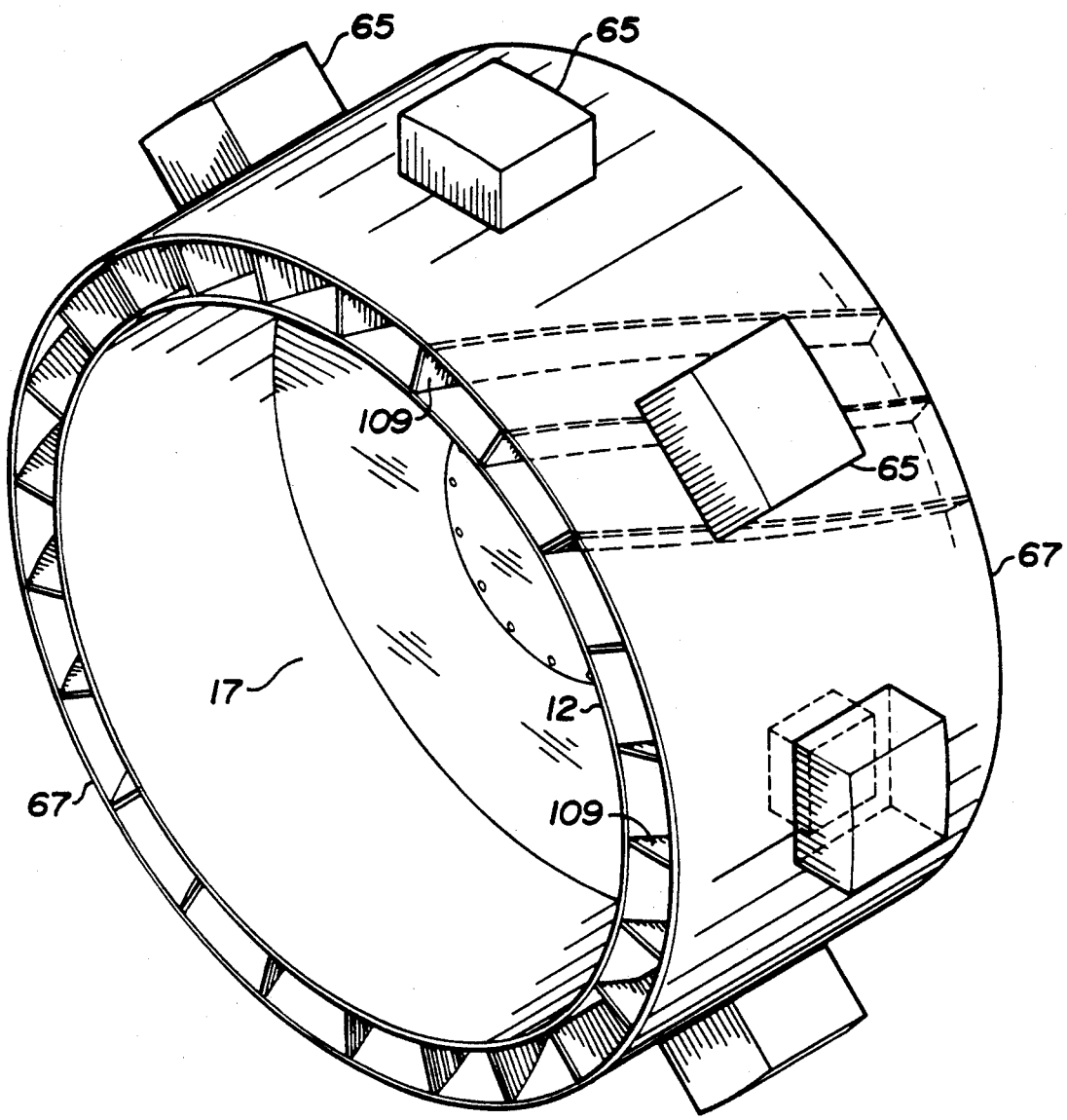
FIG. 23 is a perspective view of part of the peg-and-hole assembly of FIG. 19.
Figure 26:
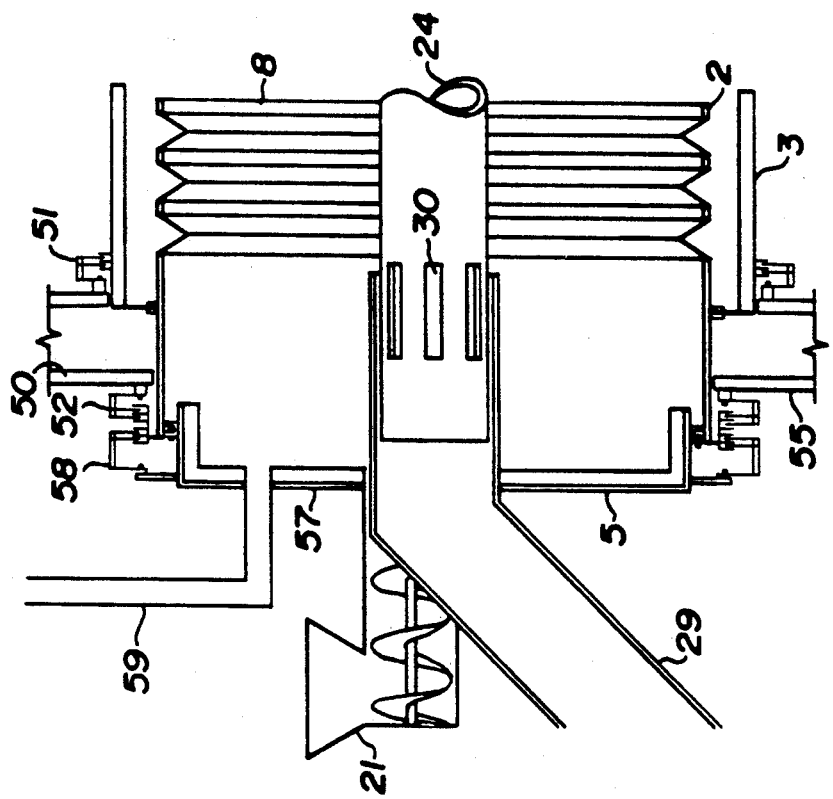
FIG. 26 is a sectional side view of the first end of the single tube processor showing the end frame, the seals and the rock recycle means.
Figure 25:
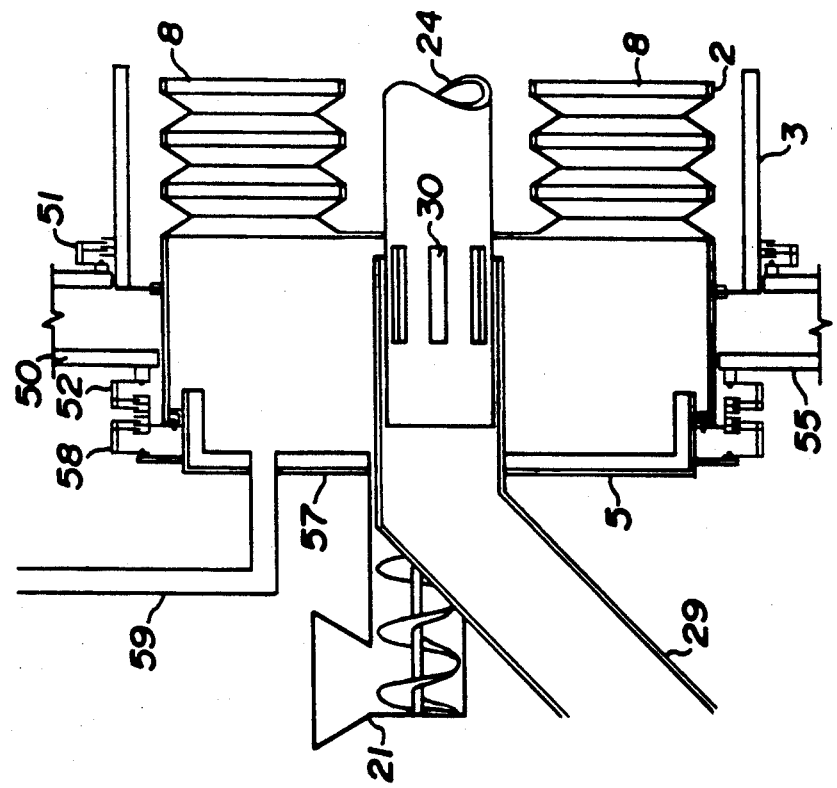
FIG. 25 is a sectional side view of the first end of the multiple tube processor showing the end frame, the seals and the rock recycle means.
Figure 27:
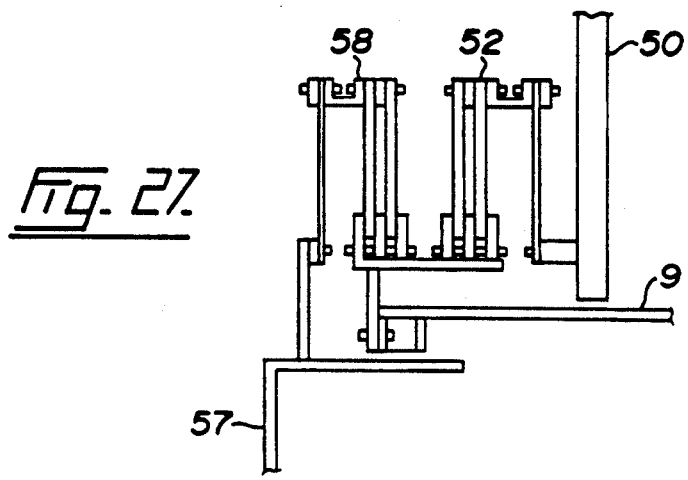
FIG. 27 is an expanded view of the seal shown in FIG. 25.
Figure 28:
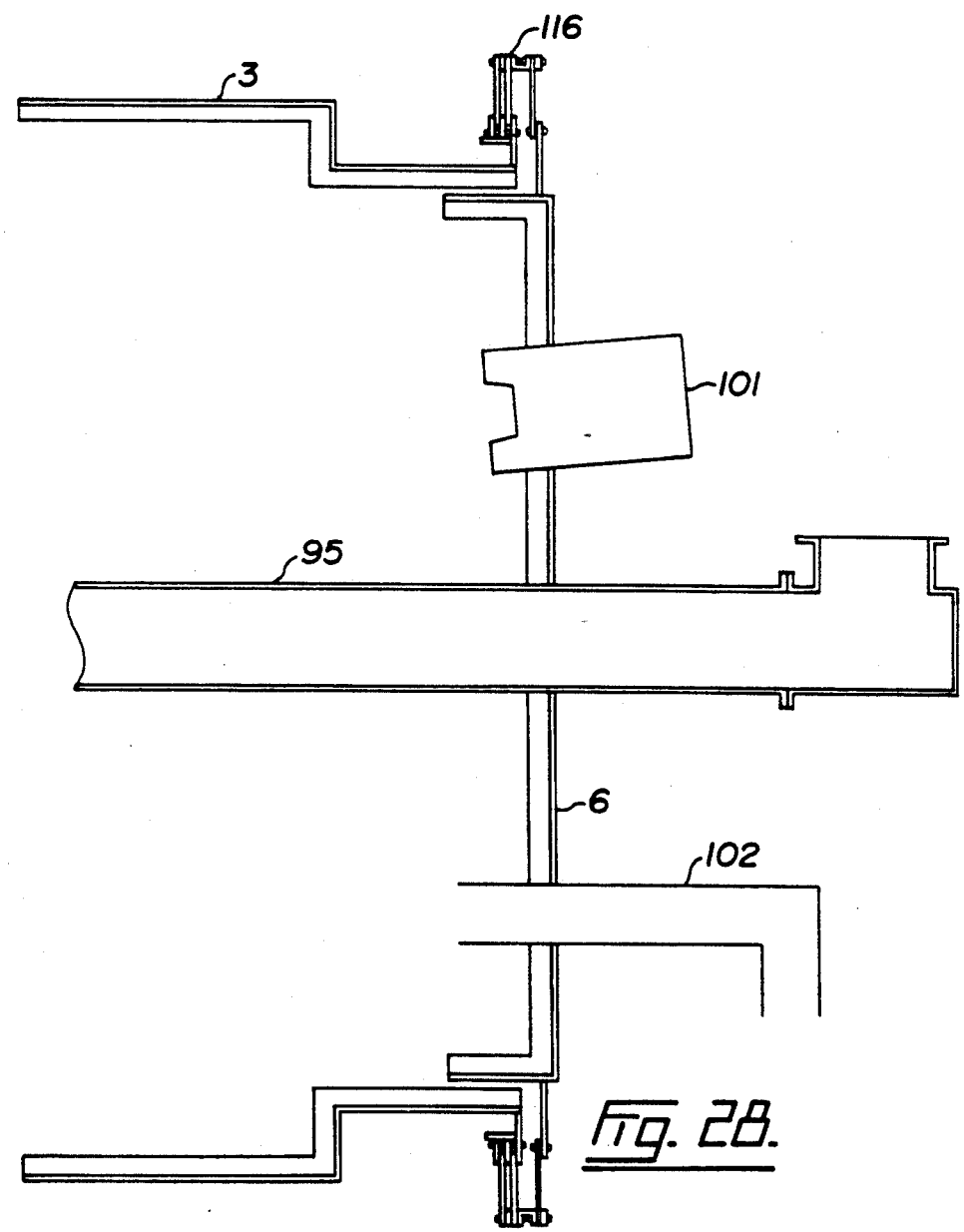
FIG. 28 is a sectional side view of the second end of the processor showing the end frame, the seal, the auxiliary burner means, and the combustion air inlet means.

FIG. 19 illustrates an alternative spoked support scheme. Instead of a rigid connection between the spoke and the outer tubular member support, a spoke 65 and matching hole 66 system is used. Inwardly projecting spokes 65, attached to the outer tubular member 3, fit in to matching holes 66 formed in a flange 67 attached to the inner tubular member 2. The dimensions of holes 66 are sufficiently precise to prevent axial or torsional movements of the inner tubular member 2, yet will permit of radial expansion.

In either of these embodiments, the differential radial expansions for inner and outer tubular members are enabled without deformation or forced displacement of said members.

Inlet End Frame

The stationary end frame 5 serves the purpose of sealing the annular space 7 and the pre-heat passageways 15 against the oxygenated atmosphere while allowing the processor 1 to rotate.

The stationary end frame 5 comprises a first housing 50 having a ring seal 51 which seals against the outer surface of the rotating first end of the outer tubular member 3. The first housing has a second ring seal 52 which seals the annular space 7 against the outer surface of the rotating inner member 2. Together, ring seals 51 and 52 close the open first end of the outer tubular member 3.

A conduit 53 connects the first housing 50 to a suction fan 54, thereby providing means for drawing flue gases from the annular space 7.

A chute 55 connects the first housing 50 to a conveyor 56, thereby providing means for removing processed solids from the annular space 7.

A second housing 57 provides a stationary mounting frame to which the feed conveying means 21 may be fastened. The second housing 57 has a ring seal 58 which seals against the outer surface of the rotating inner tubular member 2, thus enclosing its open first end. The feed conveying means 21 is connected with the second housing 57, whereby it may introduce feed into the pre-heat tubes 8.

A conduit 59 connects the second housing 57 to a suction fan 60, thereby providing means for drawing released vapors from the pre-heat zone passageways 15.

Seal at Second End of Pre-Heat Zone

A baffle 70 extends vertically across the second end of the transition tube 12 and is an extension of the flange 13.

Figure 13:
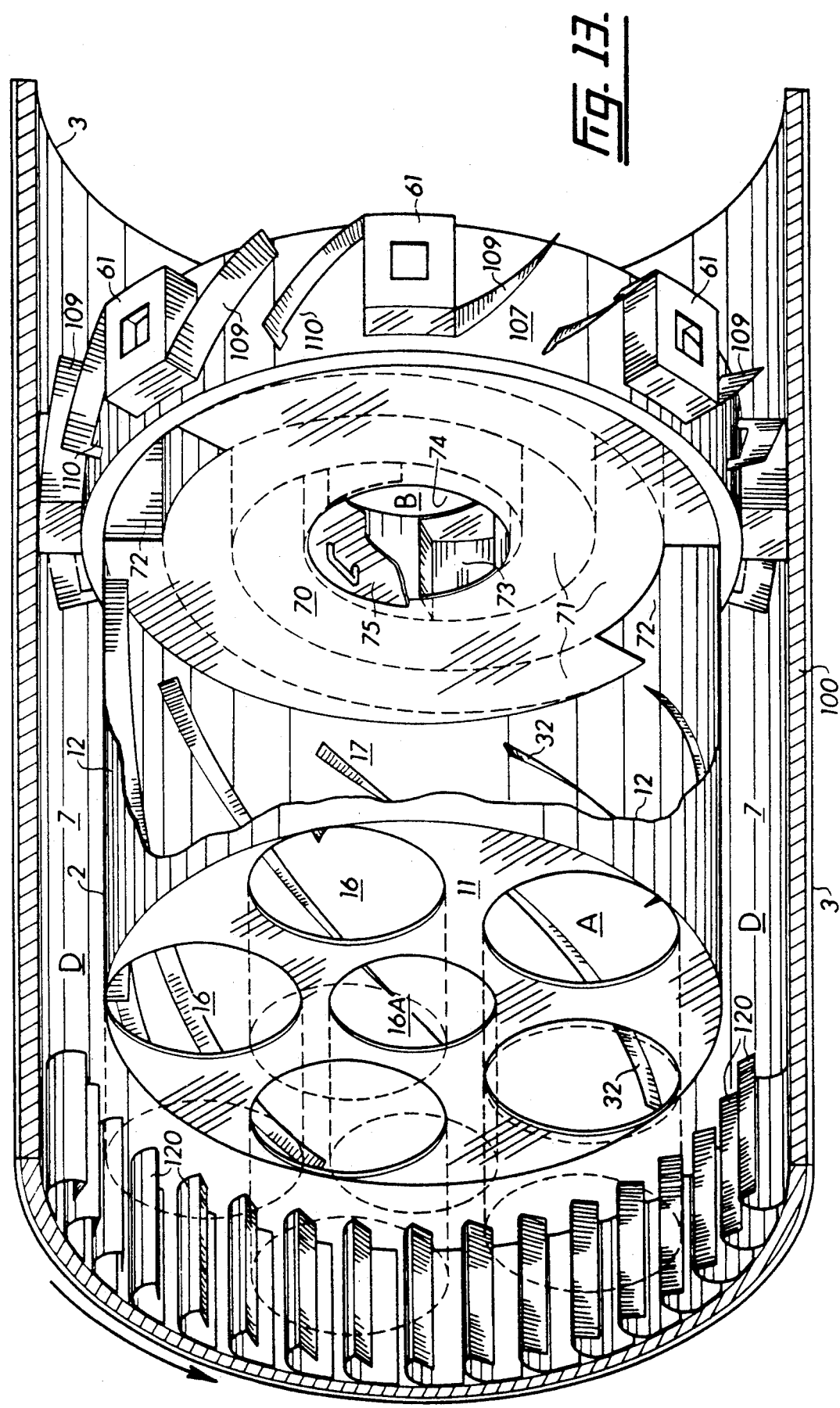
FIG. 13 is a perspective partly-broken-away view from the first end of the internals of the inner tubular member at the junction of the pre-heat and reaction zones, showing the transition tube, the seal chute and the spokes.
Figure 14:
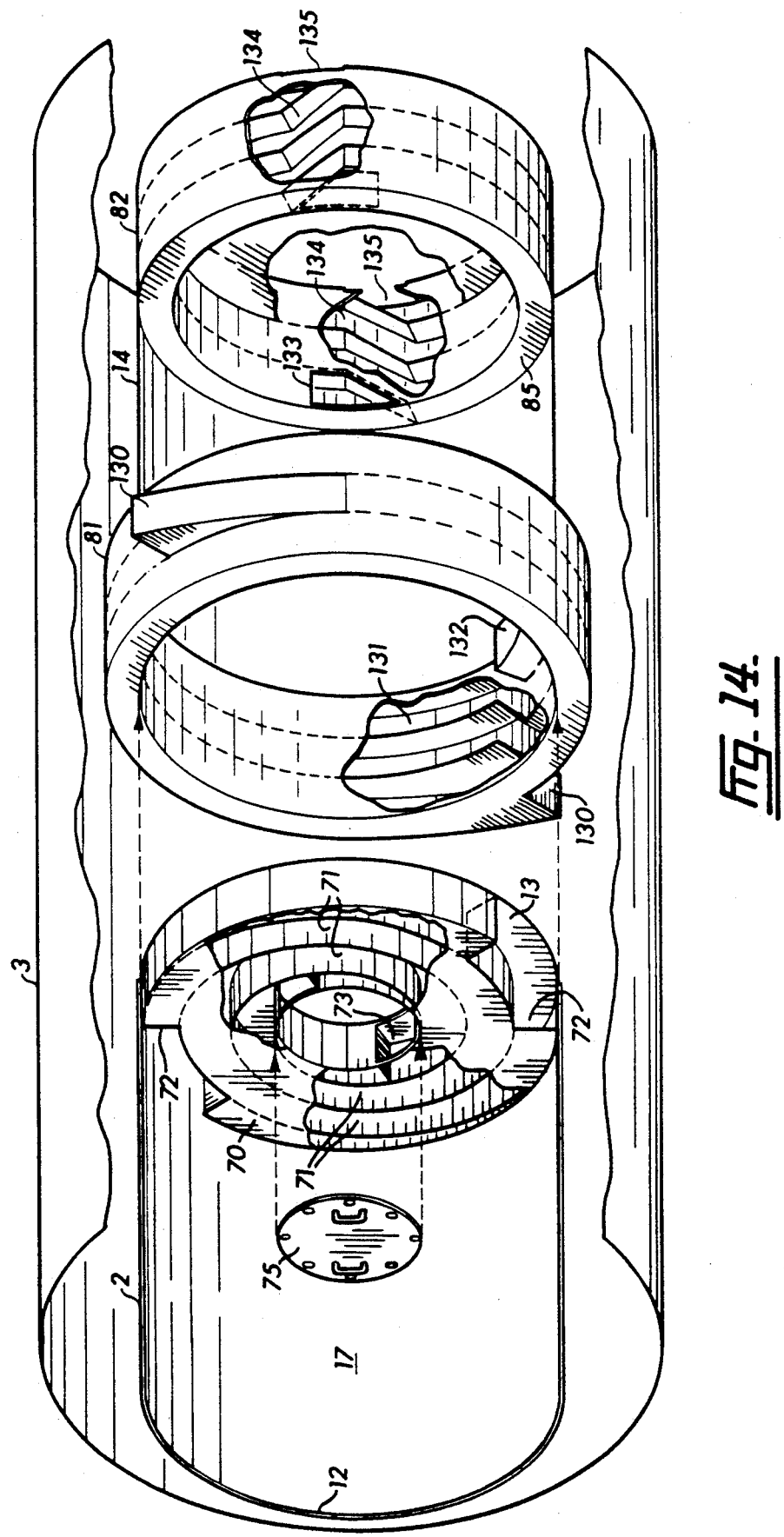
FIG. 14 is a perspective partly-broken-away view showing the major gas seal and solids transfer chutes for the processor, including the pre-heat zone to reaction zone seal, the recycle sand chutes, and the reaction zone discharge seal.
Figure 15:
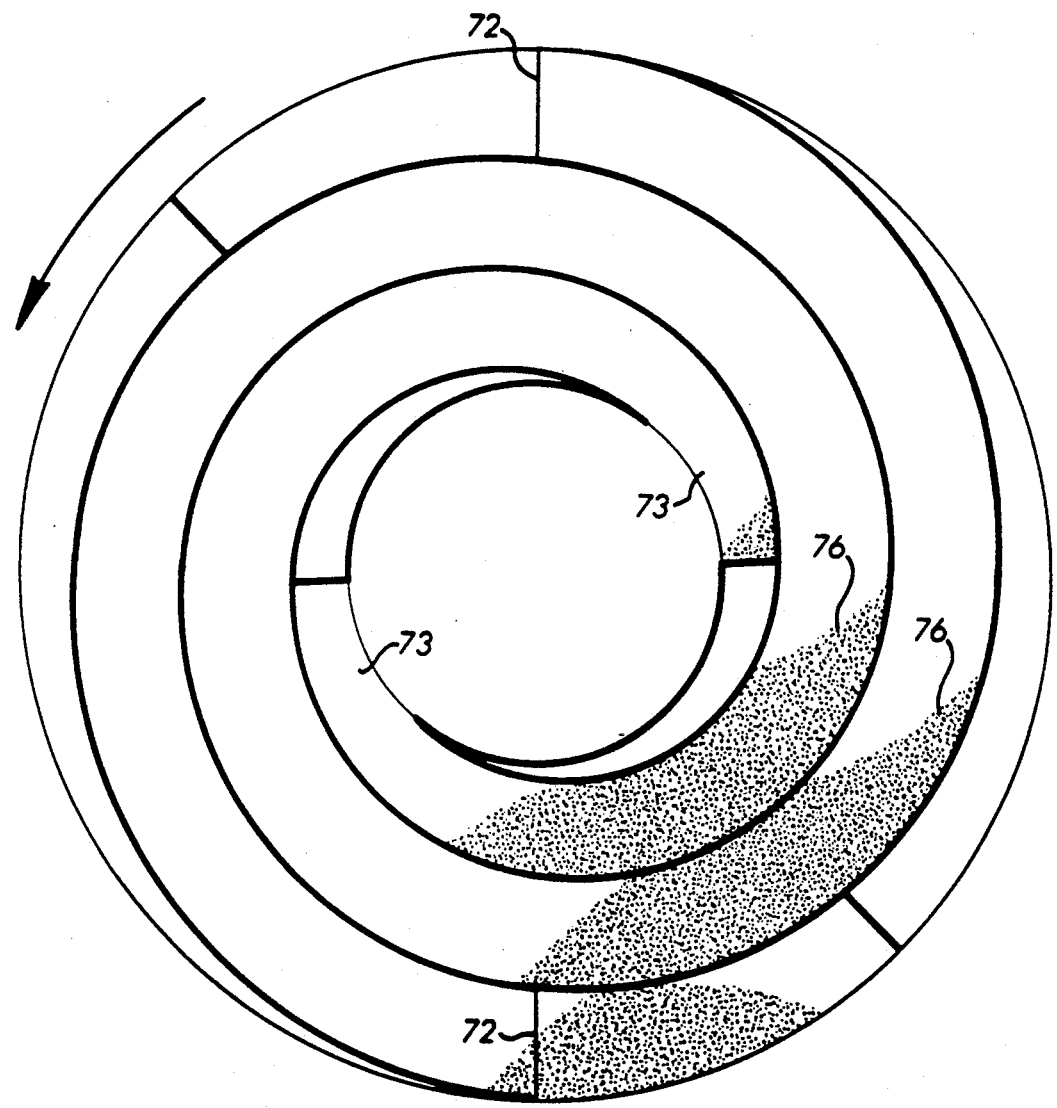
FIG. 15 is a sectional view of the pre-heat zone to reaction zone spiral seal chute of FIG. 14, showing the sealing action of the particulate bed.
Figure 16:
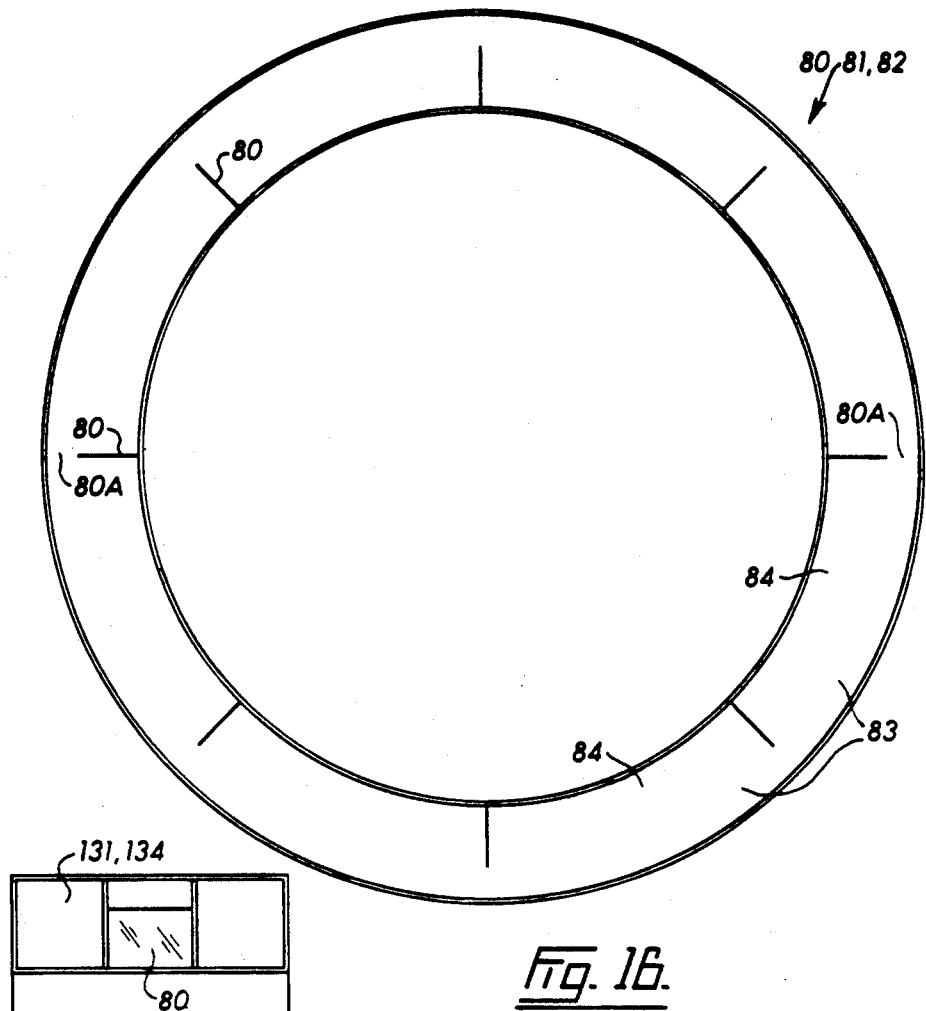
FIG. 16 is a sectional end view of the helical seal chute used at each of the reaction zone discharge and recycle areas of the processor shown in FIG. 14, illustrating the sealing arrangement involving the weirs and particulate beds.
Figure 17:
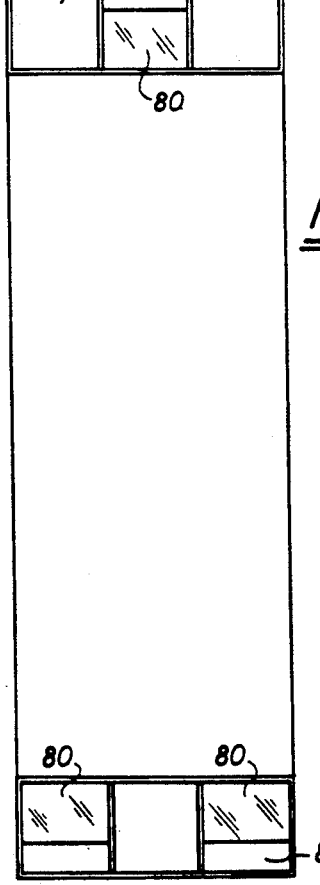
FIG. 17 is a side view of the chute of FIG. 16.
Figure 18:
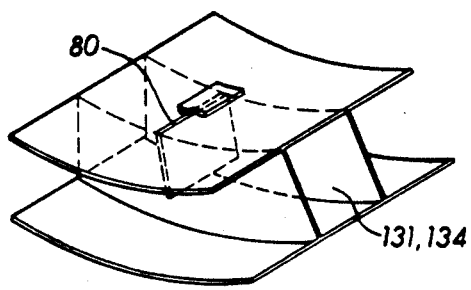
FIG. 18 is a perspective, partly-broken-away view of part of the chute of FIG. 16.

Helical tubular chutes 71 extend through openings formed in the peripheral portion of the baffle 70, as shown in FIG. 13. The inlet 72 of each chute 71 communicates with the chamber 17 of the transition tube 12. The outlet 73 of each chute 71 communicates with the reaction zone B. In operation, rotation of the chute 71 along a vertical plane will cause a unit of sand to enter the chute inlet 72 when it passes through the sand bed in the transition tube chamber 17. This unit of sand will pass through the baffle 70 via the chute 71 and will drain out the outlet 73 into the reaction zone B later in the rotational movement.

The opening 74 between the transition tube chamber 17 and the reaction zone B, central to the helical seal chutes 71, is an access port only and must be fitted with a cover baffle plate 75 for operation.

The baffle 70 and chutes 71 thus function to enable solids to move between the transition tube chamber 17 and the reaction zone B. But as explained below, they also function to prevent the gases from moving therebetween in significant amount. More particularly, if the chute 71 spirals through 360 degrees, there is always a sealing plug 76 of sand present in the chute along part of its length. This plug 76 and the solid baffle 70 combine to minimize gas movement, although there is always some small amount of gas that gets pumped through by the sand plug.

The atmosphere in the pre-heat zone A is almost entirely steam to the exclusion of most oxygen. There is no serious harm done if some of the steam reaches the reaction zone B. So the seal system between the two zones A and B can permit of some gas leakage.

The baffles 70 and 11 combine with the transition tube 12 to provide junction means between the pre-heat and vaporization tubes.

Sealing the Vaporization Tube

It is desirable to provide as effective a seal against gas movement between the reaction zone B and the annular space 7 as one can manage. If hydrocarbons move from the reaction zone B into the combustion zone C, they of course burn and the product yield from the processor 1 is reduced. If flue gases move from the annular space 7 into the reaction zone B, they contaminate the product stream and one must provide downstream means for cleaning the product.

In this connection, it is necessary to provide, at the interface between the second end of the reaction zone B and the combustion zone C and at the point at which hot solids are recycled from the annulus 7 into the first end of the reaction zone C, means for conveying particulate solids through a solid wall (such as a baffle or tube wall) while still maintaining a seal against gas migration. We use helical chutes 82, 81 for this purpose.

The combination of a solid wall and a helical chute extending therethrough is however subject to the disadvantage that a slug of gas will be pumped through the chute ahead of each discrete chute-filling charge of sand moving through it.

This problem has been significantly ameliorated by providing transverse weirs 80 at spaced intervals along the length of the internal passageways 131, 134 of each of the recycle chutes 81 and the end chutes 82 respectively. The sand forms plugs 83 at the weirs 80, which plugs substantially prevent gas passage. The small amounts of remaining entrapped gases 84 can in part work their way back through the slot 80a left between the lip of each weir 80 and the chute wall as the plug drains to the following section between subsequent weirs.

Thus, at the second end of the vaporization tube 14 there is provided a transverse baffle 85 having twin helical end chutes 82 equipped with internal weirs 80. Each chute 82 extends through a minimum of 360 degrees of rotation, typically 540 degrees or one and one half revolutions. The helical end chutes 82 communicate with apertures 133 in the baffle 85 and are operative to transfer coked solids from the reaction zone B through the baffle 85, while cooperating with contained sand plugs 83 to substantially prevent movement of gas therethrough. Each of the helical end chutes 82 progresses through 540 degrees of rotation, while occupying the minimum space by following twin, parallel, helical paths, finally discharging into the combustion zone C through apertures 135.

A tube 86 is joined to the downstream side of the baffle 85. The tube 86 is open at its downstream end and contains a helical screw 87. This tube 86 is provided simply as a spacer, to extend the delivery of the coked solids to the second end of the combustion zone C. The coked solids exiting the end chutes 82 are discharged into this tube 86 and are fed by the screw 87 through the tube outlet 88 into the second end of the combustion zone C.

Twin recycle chutes 81 are mounted around the first end of the vaporization tube 14. These rotating helical recycle chutes 81 extend through apertures 130 in the wall of the vaporization tube 14 and function to transfer hot solids, issuing from the combustion zone C, into the first end of the reaction zone B. The recycle chutes 81 also have internal weirs 80 to improve sealing against flue gas migration with sand plugs. The combination of the chute and weir structure. The discharge aperture 132 of each recycle chute 81 is fitted with a variable orifice member 89 adjustable external to the outer tubular member 3.

Comparative runs were carried out in the pilot processor wherein, on the one hand, the chutes 81, 82 were not equipped with weirs 80, and on the other hand, they were. These runs indicated that the oil product from the reaction zone B was improved by about 2 degrees API in quality when the weirs were used. Also, it was found that the hydrocarbon content in the gas stream drawn from the reaction zone B increased from about 35% by volume to about 55% when the weirs were in place.

Support For The Vaporization Tube

In the case of the single pre-heat tube processor, a plurality of rigid radially attached rod assemblies 90 interconnect the conduit 95 around its periphery with the outer tubular member 3. Dependent upon the process requirements, tube 86 may be too short or non-existent, thus requiring rods assemblies 90 to be attached to the conduit 95. These rod assemblies 90 function to support the second end of the inner tubular member 2, while permitting of differing radial and axial expansion and contraction of the tubular members 2, 3.

In the case of the multiple pre-heat tube processor, the rod assemblies 90 are shown connected tangentially and pivotally to a collar 91, which is mounted on the vaporization tube 14/86, whereby elongation of the rod assemblies 90 would result in rotation of the collar while preserving its central location. Elongation of the second end of the inner member 2 and the rotation of the collar 91 are allowed for by an adequate clearance gap between the collar 91 and the tube 86.

The Reaction Zone

In the reaction zone B, pre-heated solids having a temperature of about 550° F. are mixed with recycled hot solids having a temperature of about 1300° F. The recycle rate of hot solids is controlled to ensure a mixture temperature of about 975° F. At this temperature, the lighter hydrocarbons are vaporized and are withdrawn through the conduit 95. Coke is formed on the sand, typically being about 3% by weight of the composite particle.

The rate of recycle may be controlled by the adjustment of the recycle chute discharge orifice member 89. This adjustment is made by a mechanism mounted external to the outer tubular member 3. It would suffice in most instances to make a single adjustment for a particular feedstock and the resulting process requirements. Recycle rates of 1 to 3 times the feed rate are typical. This means that material is being transported through the reaction zone B at 2 to 4 times the processor feed rate.

The Combustion Zone

The outer tubular member 3 has a layer 100 of refractory on its inner surface. Some of the working components positioned in the annular space 7 are secured to the wall of the outer tubular member 3, but they project and function internal to the refractory layer 100.

A conventional burner 101 extends into the second end of the combustion zone C, for the supply of supplemental heat.

Combustion air is supplied to the combustion zone C, in about the stoichiometric amount or a slight excess oxygen condition, via a tube 102 extending into the second end of the combustion zone, for combustion of the coke.

Lifters 104 and 104a are attached to the wall of the outer tubular member 3 and the vaporization tube 14 at spaced intervals throughout the length of the combustion zone C.

The coke particles only burn satisfactorily when they are repeatedly lifted and dropped in the form of a curtain through the pre-heated air flow. So the lifting capacity of the lifters 104 has to be sufficient to ensure that the process objectives for heat supply are achieved.

The heat supplied by the burner 101 is utilized to supplement the heat derived from combustion, as required to bring the solids to the desired 1300° F. in the case of oil sand.

The solids are advanced through the annular space 7 by a combination of the gas carrying capabilities of the exhaust stream and angled plates (not shown) affixed to the inside surface of the outer tubular member 3.

As has previously been mentioned, part of the burned hot solids are picked up by the recycle chute 81 and returned to reaction zone B. To ensure that this capability is maintained during start-up and operation of the processor 1, we have provided a structure associated with the spokes 61 which prevents the hot solids from moving downstream of the recycle chute 81 until it is being well supplied with solids to be recycled.

More particularly, the spokes 61 are attached to an air plenum 107 which is secured to the transition tube 12. Between the spokes 61, web segments 109 are also attached to the air plenum 107, the outer edges of the web segments 109 are spaced from the inside surface of the outer tubular member 3, to thus form an annular gap 109a. Some of the web segments 109 have an aperture 110 close to the air plenum 107. The web segments 109 are adapted to reverse the sand advancing through the annular space 7, yet the gaps 109a enable free passage of the exhaust gases flowing through the annular space 7. Thus the sand builds up when it first begins to move through the annular space 7. The sand begins to spill through the apertures 110 when it reaches them—but by that time the recycle chutes 81 are able to scoop deeply into the built-up bank of sand. The apertures 110 lead the overspill solids to the heat transfer zone B.

The Combustion Zone End Frame

The combustion zone stationary end frame 6 at the second end of the outer tubular member serves the purpose of sealing the annular space 7 and the combustion zone C from the external oxygenated atmosphere, while allowing the processor 1 to rotate. The end frame 6 has a ring seal 116 which seals against the outer surface of the rotating second end of the outer tubular member 3. The auxiliary burner 101 is installed in the end frame 6 and projects into the combustion zone annulus C. The tube 102 projects through the end frame 6, for supplying combustion air from a blower fan 103.

The Heat Transfer Zone

The outer tubular member 3 has lifters 120 attached to it in the heat transfer zone D, for lifting the hot solids and dropping them onto the pre-heat tubes 8.

Since it is desirable that the hot solids be repeatedly brought into contact with the pre-heat tubes, the lifter capacity may be as much as the space available allows, yet maintaining adequate access for maintenance. Similar rules apply here as for the determination of combustion zone lifter size and number. The free cross section area of the zone preferably should not be less than that of the combustion zone cross sectional area as this affects the gas velocities. The zone length and volume is dependent upon the pre-heat zone length which has been previously determined.

The Riding Ring Assemblies

A plurality of riding ring assemblies 150 are provided at spaced points along the length of the outer tubular member 3. The assemblies 150 function to support and rotate the processor. More particularly, each riding ring assembly 150 comprises an inner ring 151, affixed to the outer tubular member 3, and an outwardly spaced outer ring 152 attached to the inner ring by a plurality of webs 153. The webs 153 function as heat dissipating fins so that the outer ring 152 is considerably cooler than the inner ring 151. Each ring assembly 150 is rotatably supported by rubber tires 154 mounted on support standards 155. The ring assemblies 150 are rotated by driven tires 156.

This arrangement has the following advantages:

the double ring structure with intermediate heat exchange webs 153 is designed to ensure that the outer rings 152 are sufficiently cool so as not to damage the rubber tires 154; and the use of the rubber tires 154, preferably inflated, permits of reasonable variation in the manufacturing tolerances for the rings.

EXAMPLE I

The performance of the processor is illustrated by results achieved using the pilot plant unit. This unit processed a variety of feedstocks, including oil sand obtained from the Athabasca region of Alberta, Canada. The average continuous feed rate achieved was about 4.5 tons per hour at a rotational speed of 4.5 to 5 rpm.

The unit was nearly 27 feet in length, with an outer member diameter of just over 9 feet. Due to its small size, experimental nature, and a desire for economical modifications, a single pre-heat tube version was implemented. The inner tubular member formed a corrugated, 11.5 foot long, 5.5 foot outer diameter pre-heat zone and a 7.9 foot long, 3.9 foot inner diameter reaction zone. The second end of the pre-heat tube was connected to a 2 foot long transition tube which contained the pre-heat-to-reaction zone seal. The pre-heat zone had a surface area of 340 square feet, which is a 45% increase over a plain non-corrugated shell. The depth of the bed in the pre-heat zone was about 6 inches, resulting in a bed angle of about 110 degrees. The reaction zone depth was operated to achieve a zone fill of about 20% of the total volume. With a recycling sand ratio of about 1 to 1.5, this resulted in reaction zone material retention times of about 4 minutes. The combustion zone comprised a volume defined by a length of 9.8 feet and a inner process diameter within the insulation of 7.8 feet. Sixteen equally spaced combustion zone lifters were provided, mounted internally to the outer tubular member. The lifters were of an "L" shape, projecting 10 inches radially inward with a 6 inch right angle tip. The heat transfer zone was 13.5 feet long with an inner process diameter of 7.8 feet. This zone contained 16 lifter sets with a 4 inch by 4 inch "L" shape configuration. Feed was delivered to the pre-heating zone via a sealed belt conveyor projecting through the end frame at the first end. Flue gases were extracted through a hood and spent hot solids were discharged through a chute in this end frame. Pre-heat zone vapors were drawn from the pre-heat zone through a conduit projecting through the end frame. Twin fuel oil auxiliary burners and twin combustion air conduits projected through the end frame at the second end. The processor rotated on two steel riding rings, powered by a variable speed, hydraulic chain drive.

Illustration of the pilot plant performance may be characterized by a selected group of runs totalling nearly 175 hours of operation at an average 4.4 tons/-hour. This group of runs was specifically performed on Athabasca oil sand run-of-the-mine material, where no selection of the feedstock quality was made. These runs were selected from a much larger body of information with many different feed stock and operating objectives. The hydrocarbon products were processed only once, that is, no recycling of the heavier products to the reaction zone were performed.

This material had a average bitumen content of 10.0 weight %, 5.4% water, the remaining 84.6% being quartz sand.

The bitumen was converted to a number of products when processed through the pilot unit. The bitumen products were converted to 77.0% butane ($C_4H_{10}$) and heavier hydrocarbons, 8.1% propane ($C_3H_8$) and lighter hydrocarbons (including hydrogen), 4.4% coke and 10.5% carbon present in the gas streams as carbon monoxide (CO) and carbon dioxide ($CO_2$). This was achieved with an average reaction zone temperature of 976 degrees F. and a combustion zone temperature of 1216° F.

The product oil, which is considered to be the butane and heavier hydrocarbons, had an overall product gravity of 23 degrees API, which is equivalent to a specific gravity of 0.916. The average viscosity was 8.5 centipoise at 30 degrees C. Athabasca bitumen gravity averages about 8.8 degrees API or a specific gravity of 1.009, being heavier than water.

The processor consumed 3.4 million Btu/hour of which 1.4 million or over 40% was supplied by the combustion of coke, the rest being supplied by auxiliary fuel. An average 70% of the available coke was consumed. Over 0.7 million Btu/hour were lost through the outer tubular member.

EXAMPLE II

A typical application of the single pre-heat tube processor is dump site clean-up or waste processing, in which a hydrocarbon contaminated soil must be processed to recover the hydrocarbons and discharge an environmentally inert soil. These sites are often of a low overall tonnage and are widely placed geographically. This suggests using a processor of a low capacity and one small enough to be transported from site to site.

One example of a contaminated soil application is that of a soil impregnated with polychlorinated biphenyl or PCB's as known in the current terminology of the media.

The pilot unit was tested on about 23 on artificially prepared soils, contaminated by mixing with nearly 600 pounds of PCB's.

Of 100% of the PCB oil fed to the processor, only 0.04% was detected as discharges to the environment, 93% was recovered as liquid oils, and the remaining 7% was in large part converted to coke or combustion by-products CO or $CO_2$.

The embodiments of the invention in which an exclusive property or privilege is claimed are defined as followed:

1. A dry thermal processor for recovering vaporizable substances from particulate host solids, comprising:
   inner and outer, radially spaced apart, interconnected tubular members which rotate together in response to a drive applied to the outer tubular member;
   said inner tubular member comprising a plurality of substantially parallel spaced apart pre-heat tubes each having first and second ends, a vaporization tube having first and second ends, and tubular junction means having a first end for connecting the second ends pre-heat tubes thereto and a second end for connecting the first end of the vaporization tube thereto:
   said pre-heat tubes each having an open internal passageway which passageways collectively form a preheat zone having first and second ends proximate the first and second ends of the pre-heat tubes, respectively, said vaporization tube having an open internal passageway that forms a reaction zone having first and second ends proximate the first and second ends of the vaporization tube, respectively, whereby sequential pre-heat and reaction zones are provided by the inner tubular member;
   said inner and outer tubular members each having first ends corresponding with the first end of the pre-heat zone and second ends corresponding to the second end of the reaction zone;
   means, associated with the junction means, for passing solids from the pre-heat zone to the reaction zone and restricting gas movement therebetween;
   said tubular members forming an annular space with first and second ends between them to provide sequential open combustion and heat transfer zones proximate the reaction zone and pre-heat zone, respectively, the open combustion and heat transfer zones each having first and second ends, said combustion zone terminating at its second end proximate the second end of the junction means and said heat transfer zone beginning at its first end proximate the first end of the junction means;
   means for closing the second end of the vaporization tube;
   means for passing coked solids from the second end of the reaction zone, through said vaporization tube closing means, into the combustion zone and restricting gas movement between said zones;
   means, located at the second end of the junction means, for recycling hot solids from the second end of the combustion zone into the first end of the reaction zone and restricting gas movement therebetween;
   means for drawing gases separately from the pre-heat zone, the reaction zone, and the annular space;
   said inner and outer tubular members having means for advancing solids at a controlled rate through the pre-heat and reaction zones and back through the combustion and heat transfer zones;
   means extending into the combustion zone for injecting oxidizing gas thereinto for supporting combustion;
   means extending into the combustion zone for supplying supplemental heat thereinto;
   said outer tubular member carrying internal lifters in the combustion zone for lifting and dropping coked solids passing therethrough to assist combustion;
   said outer tubular member carrying internal lifters in the heat transfer zone for lifting and dropping hot solids onto the pre-heat tubes;
   stationary first and second end frames associated with the tubular members and closing the first and second ends of the annular space;
   first means for closing the first end of the inner tubular member;
   means for feeding feedstock into the first ends of the pre-heat tubes through the first means;
   means for removing cooled solids from the first end of the annular space through the first end frame; and means for rotating the outer tubular member.

2. The processor as set forth in claim 1 wherein:
   the pre-heat tubes are interconnected for mutual support.

3. The processor as set forth in claim 2 comprising:
a rock recycle tube having first and second ends, said rock recycle tube forming an internal passageway and extending through the space formed between the pre-heat tubes, said recycle tube having its second end communicating with the junction means, said recycle tube being arranged at its first end so as to reject oversize solids from the processor through the first means;
means, positioned in the junction means, for screening and separating oversize solids from the feedstock leaving the second ends of the pre-heat tubes; and
means, interconnecting the oversize screening and separating means with the second end of the rock recycle tube passageway, for conveying the oversize solids from the former to the latter.

4. The processor as set forth in claim 3 comprising:
means at the first end of the rock recycle tube for feeding part of the oversize solids passing therethrough into the first ends of the pre-heat tubes.

5. The processor as set forth in claim 3 wherein:
the wall of each pre-heat tube is circumferentially corrugated along at least the major portion of its length.

6. The processor as set forth in claim 5 comprising:
means at the first end of the rock recycle tube for feeding part of the oversize solids passing therethrough into the first ends of the pre-heat tubes.

7. The processor as set forth in claim 1 wherein:
the wall of each pre-heat tube is circumferentially corrugated along at least the major portion of its length.

8. The processor as set forth in claim 7 comprising:
a rock recycle tube having first and second ends, said rock recycle tube forming a passageway and extending through the space formed between the pre-heat tubes, said recycle tube having its second end communicating with the junction means, said recycle tube being arranged at its first end so as to reject oversize solids from the processor through the first means;
means, positioned in the junction means, for screening and separating oversize solids from the feedstock leaving the second ends of the pre-heat tubes; and
means, interconnecting the oversize screening and separating means with the second end of the rock recycle tube passageway, for conveying the oversize solids from the former to the latter.

9. The processor as set forth in claim 8 comprising:
means at the first end of the rock recycle tube for feeding part of the oversize solids passing therethrough into the first ends of the pre-heat tubes.

10. The processor as set forth in claim 7 wherein:
a plurality of radially extending spokes interconnect the inner and outer tubular members at the junction means, the material forming the spokes and the material forming the section of the outer tubular member in the area of the spokes being complementary, so that the spokes and the outer tubular member segment expand and contract at about the same rate;
said spokes being operative to lock the inner and outer tubular members together whereby they rotate as a unit, to pin them together to prevent relative axial displacement, and to support and centralize the inner tubular member in the outer tubular member.

11. The processor as set forth in claim 10 comprising:
means extending inwardly from the outer tubular member for supporting the pre-heat tubes in a generally vertical direction to prevent sagging thereof, said means being arranged so as to support the pre-heat tubes while enabling them to expand and contract axially and radially.

12. The processor as set forth in claim 11 wherein:
the support means is an upstanding steel membrane connecting the pre-heat tubes with the outer tubular member.

13. The processor as set forth in claim 11 comprising:
means extending inwardly from the outer tubular member for supporting the second end of the vaporization tube in a generally vertical plane, said means being arranged so as to supported the vaporization tube while enabling it to expand and contract axially and radially.

14. The processor as set forth in claim 13 wherein:
the support means for the first ends of the pre-heat tubes is an upstanding steel membrane connecting the pre-heat tubes with the outer tubular member; and
the means interconnecting the second end of the vaporization tube with the outer tubular member is a collar rotatably mounted around the vaporization tube and a plurality of rods tangentially and pivotally connected with the collar and the outer tubular member.

15. The processor as set forth in claim 13 comprising:
a rock recycle tube having first and second ends, said rock recycle tube forming a passageway and extending through the space formed between the pre-heat tubes, said recycle tube having its second end communicating with the junction means, said recycle tube being arranged at its first end so as to reject oversize solids from the processor through the first means;
means, positioned in the junction means, for screening and separating oversize solids from the feedstock leaving the second ends of the pre-heat tubes; and
means, interconnecting the oversize screening and separating means with the second end of the rock recycle tube passageway, for conveying the oversize solids from the former to the latter.

16. The processor as set forth in claim 15 comprising:
means at the first end of the rock recycle tube for feeding part of the oversize solids passing therethrough into the first ends of the pre-heat tubes.

17. The processor as set forth in claim 1 wherein:
the means for recycling hot solids from the combustion zone to the vaporization zone comprises an open-ended chute, of helical configuration, carried by the inner tubular member and extending through the wall of said member, said chute having a scoop inlet in the combustion zone, for picking up a charge of hot solids, and an outlet communicating with the vaporization zone, said chute having a plurality of weirs mounted transversely in the passageway of the chute at points spaced along its length, said weirs extending up from the floor of the chute; and
the means for passing coked solids from the reaction zone through the means closing the second end of the vaporization tube into the combustion zone comprises an open-ended chute of helical configuration having a plurality of weirs mounted transversely in the passageway of the chute at points spaced along its length, said weirs extending up from the floor of the chute.

18. The processor as set forth in claim 17 wherein:
the wall of each pre-heat tube is corrugated along at least the major portion of its length.

19. The processor as set forth in claim 18 comprising:
a rock recycle tube having first and second ends, said rock recycle tube forming a passageway and extending through the space formed between the pre-heat tubes, said recycle tube having its second end communicating with the junction means, said recycle tube being arranged at its first end so as to reject oversize solids from the processor through the first means;
means, positioned in the junction means, for screening and separating oversized solids from the feedstock leaving the second ends of the pre-heat tubes; and
means interconnecting the oversize screening and separating means with the second end of the rock recycle tube passageway, for conveying the oversize solids from the former to the latter.

20. The processor as set forth in claim 19 wherein:
a plurality of radially extending spokes interconnect the inner and outer tubular members at the junction means, the material forming the spokes and the material forming the section of the outer tubular member in the area of the spokes being complementary, so that the spokes and the outer tubular member segment expand and contract at about the same rate;
said spokes being operative to lock the inner and outer tubular members together whereby they rotate as a unit, to pin them together to prevent relative axial displacement, and to support and centralize the inner tubular member in the outer tubular member.

21. The processor as set forth in claim 20 comprising:
means extending inwardly from the outer tubular member for supporting the pre-heat tubes in a generally vertical direction to prevent sagging thereof, said means being arranged so as to so support the pre-heat tubes while enabling them to expand and contract axially and radially.

22. The processor as set forth in claim 21 comprising:
means extending inwardly from the outer tubular member for supporting the second end of the vaporization tube in a generally vertical plane, said means being arranged so as to support the vaporization tube while enabling it to expand and contract axially and radially.

23. A dry thermal processor for recovering vaporizable substances from particular host solids, comprising:
inner and outer, radially spaced apart, interconnected tubular members which rotate together in response to a drive applied to the outer tubular member;
means for applying the drive to the outlet tubular member to rotate the outer tubular member;
said inner tubular member comprising a pre-heat tube having first and second ends, a vaporization tube having first and second ends, a tubular junction means having a first end for connecting the second ends of the pre-heat tube thereto and a second end for connecting the first end of the vaporization tubes thereto;
said pre-heat tube having an open internal passageway which forms a pre-heat zone with first and second ends proximate the first and second ends of the pre-heat tubes, respectively, said vaporization tube having an open internal passageway that forms a reaction zone having first and second ends proximate the first and second ends of the vaporization tube, respectively, whereby sequential pre-heat and reaction zones are provided by the inner tubular member;
said inner and outer tubular members each having first ends corresponding with the first end of the pre-heat zone and second ends corresponding to the second end of the reaction zone;
the wall of the pre-heat tube being circumferentially corrugated along at least the major part of its length;
means, associated with the junction means, for passing solids from the pre-heat zone to the reaction zone and restricting gas movement therebetween;
a plurality of radially extending spokes interconnecting the inner and outer tubular members at the junction means, the material forming the spokes and the material forming the section of the outer tubular member at the spokes being complementary so that the spokes and the outer tubular member section expand and contract at about the same rate, the spokes being arranged so as to lock the inner and outer tubular members together so that they rotate as a unit, to pin them together to prevent relative axial displacement, and to support and centralize the inner tubular member in the outer tubular member;
said tubular members forming an annular space with first and second ends between them to provide sequential open combustion and heat transfer zones proximate the reaction zone and pre-heat zone, respectively, the open combustion and heat transfer zones each having first and second ends, said combustion zone terminating at its second end proximate the second end of the junction means and said heat transfer zone beginning at its first end proximate the first end of the junction means;
means for closing the second end of the vaporization tube;
means for passing coked solids from the second end of the reaction zone, through said vaporization tube closing means, into the combustion zone and restricting gas movement between said zones;
means, located at the second end of the junction means, for recycling hot solids from the second end of the combustion zone into the first end of the reaction zone and restricting gas movement therebetween;
means for drawing gases separately form the pre-heat zone, the reaction zone, and the annular space;
said inner and outer tubular members having means for advancing solids at a controlled rate through the pre-heat and reaction zones and back through the combustion and heat transfer zones;
means extending into the combustion zone for injecting oxidizing gas thereinto for supporting combustion;
means extending into the combustion zone for supplying supplemental heat thereinto;
said outer tubular member carrying internal lifters in the combustion zone for lifting and dropping coked solids passing therethrough to assist combustion;

said outer tubular member carrying internal lifters in the heat transfer zone for lifting and dropping hot solids onto the pre-heat tube;

stationary first and second end frames associated with the ends of the tubular members and closing the first and second ends of the annular space;

first means for closing the first end of the inner tubular member;

means for feeding feedstock into the first end of the pre-heat tube through the first means;

means for removing cooled solids from the first end of the annular space through the first end frame;

a rock recycle tube having first and second ends, said rock recycle tube forming an open internal passageway and extending centrally through the pre-heat tube, said recycle tube having its second end communicating with the junction means, said recycle tube being arranged at its first end so as to reject oversize solids from the processor through the first means;

means, positioned in the junction means, for screening and separating oversize solids from the feedstock leaving the second end of the pre-heat tube; and means, interconnecting the oversize screening and separating means with the second end of the rock recycle tube, for conveying the oversize solids from the former to the passageway of the latter.

24. The processor as set forth in claim 23 comprising:
means extending inwardly from the outer tubular member for supporting the second end of the vaporization tube in a generally vertical plane, said means being arranged so as to support the vaporization tube while enabling it to expand and contract axially and radially.

25. The processor as set forth in claim 24 wherein:
the means for recycling hot solids from the combustion zone to the vaporization zone comprises an open-ended chute, of helical configuration, carried by the inner tubular member and extending through the wall of said member, said chute having a scoop inlet in the combustion zone, for picking up a charge of hot solids, and an outlet communicating with the vaporization zone, said chute having a plurality of weirs mounted transversely in the passageway of the chute at points spaced along its length, said weirs extending up from the floor of the chute; and the means for passing coked solids from the reaction zone through the closing means into the combustion zone comprises an open-ended chute of helical configuration having a plurality of weirs mounted transversely in the passageway of the chute at points spaced along its length, said weirs extending up from the floor of the chute.

26. The processor as set forth in claim 23 wherein:
the means for recycling hot solids from the combustion zone to the vaporization zone comprises an open-ended chute, of helical configuration, carried by the inner tubular member and extending through the wall of said member, said chute having a scoop inlet in the combustion zone, for picking up a charge of hot solids, and an outlet communicating with the vaporization zone, said chute having a plurality of weirs mounted transversely in the passageway of the chute at points spaced along its length, said weirs extending up from the floor of the chute; and the means for passing coked solids from the reaction zone through the closing means into the combustion zone comprises an open-ended chute of helical configuration having a plurality of weirs mounted transversely in the passageway of the chute at points spaced along its length, said weirs extending up from the floor of the chute.

27. The processor as set forth in claim 23 comprising:
an upstanding steel membrane, extending inwardly from the outer tubular member, for supporting the pre-heat tube at its first end while enabling it to expand and contract axially and radially.

28. The processor as set forth in claim 27 comprising:
a collar rotatably mounted around the vaporization tube and a plurality of rods tangentially and pivotally connected with the collar and the outer tubular member, for supporting the vaporization tube while enabling it to expand and contract axially and radially.

* * * * *